US011688431B2

(12) United States Patent
Miyamura et al.

(10) Patent No.: US 11,688,431 B2
(45) Date of Patent: Jun. 27, 2023

(54) TAPE REPOSITION MANAGEMENT IN A TAPE DATA STORAGE DRIVE

(71) Applicant: INTERNATIONAL BUSINESS MACHINES CORPORATION, Armonk, NY (US)

(72) Inventors: Tsuyoshi Miyamura, Yokohama (JP); Atsushi Abe, Ebina (JP); Setsuko Masuda, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 261 days.

(21) Appl. No.: 17/313,630

(22) Filed: May 6, 2021

(65) Prior Publication Data
US 2022/0358967 A1 Nov. 10, 2022

(51) Int. Cl.
G06F 12/00 (2006.01)
G11B 27/32 (2006.01)
(Continued)

(52) U.S. Cl.
CPC .......... *G11B 27/328* (2013.01); *G06F 3/0682* (2013.01); *G06F 16/10* (2019.01); *G11B 27/002* (2013.01)

(58) Field of Classification Search
CPC . G11B 27/328; G11B 27/002; G11B 2220/95; G11B 27/107; G06F 3/0682;
(Continued)

(56) References Cited

U.S. PATENT DOCUMENTS 8,918,651 B2 12/2014 Greco et al.
9,021,175 B2 4/2015 Butt et al.
(Continued)

FOREIGN PATENT DOCUMENTS

| CN | 103080896 B | 5/2013 |
|---|---|---|
| CN | 111344681 A | 6/2020 |
| JP | 2014081988 A | 5/2014 |

OTHER PUBLICATIONS

PCT International Search Report and Written Opinion dated Jun. 24, 2022, pp. 9, Application No. PCT/CN2022/083778, filed Mar. 29, 2022.

*Primary Examiner* — Shawn X Gu
*Assistant Examiner* — Mohammad S Hasan
(74) *Attorney, Agent, or Firm* — Konrad Raynes Davda & Victor LLP; William K. Konrad

(57) ABSTRACT

In one aspect of tape repositioning management in accordance with the present description, in response to loading a tape in a tape drive, mounting the tape linear tape file system (LTFS) is initiated including reading an index partition on the tape to extract metadata for mounting the tape LTFS, and prior to accessing a data area of the tape in response to any application access request, the tape is repositioned within a data partition to read a vHRTD (virtual High Resolution Tape Directory) recorded in an EOD (End of Data) portion such as an EOD data set, for example, of the data partition. The EOD portion is read to retrieve the vHRTD to facilitate application requested accesses to the tape. In one embodiment, repositioning and stopping the tape at the beginning of the data partition after reading the index partition containing metadata is bypassed.

20 Claims, 14 Drawing Sheets

(51) Int. Cl.
    *G06F 3/06*     (2006.01)
    *G11B 27/00*     (2006.01)
    *G06F 16/10*     (2019.01)

(58) Field of Classification Search
    CPC ...... G06F 16/10; G06F 3/0616; G06F 3/0644;
                              G06F 16/13; G06F 16/196
    See application file for complete search history.

(56) References Cited

U.S. PATENT DOCUMENTS

| | | | |
|---|---|---|---|
| 9,401,180 B2 | 7/2016 | Abe et al. | |
| 9,690,486 B2 | 6/2017 | Abe et al. | |
| 10,229,718 B1 | 3/2019 | Hasegawa et al. | |
| 10,423,336 B2 | 9/2019 | Abe et al. | |
| 10,734,021 B1 | 8/2020 | Miyamura et al. | |
| 10,818,314 B1* | 10/2020 | Miyamura | G11B 5/00813 |
| 2012/0054428 A1* | 3/2012 | Butt | G06F 3/0686 |
| | | | 711/111 |
| 2014/0108720 A1* | 4/2014 | Abe | G06F 3/0682 |
| | | | 711/111 |
| 2014/0181425 A1* | 6/2014 | Ashida | G06F 16/1774 |
| | | | 711/153 |
| 2014/0215145 A1* | 7/2014 | Ballard | G06F 3/0682 |
| | | | 711/111 |
| 2015/0127980 A1* | 5/2015 | Klein | G06F 11/1458 |
| | | | 714/15 |
| 2015/0347022 A1* | 12/2015 | Ashida | G06F 3/0686 |
| | | | 711/113 |
| 2017/0090761 A1* | 3/2017 | Hasegawa | G06F 3/064 |
| 2017/0168735 A1* | 6/2017 | Hasegawa | G06F 3/0682 |
| 2019/0361606 A1 | 11/2019 | Goker et al. | |

* cited by examiner

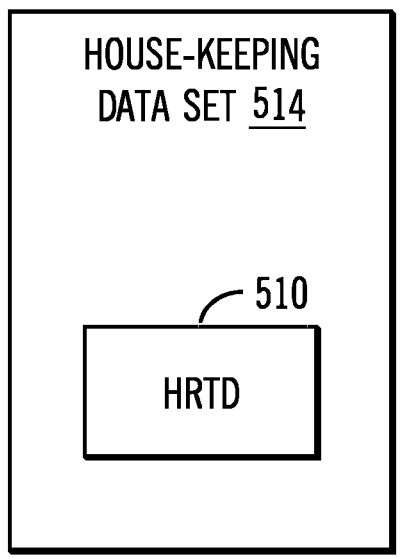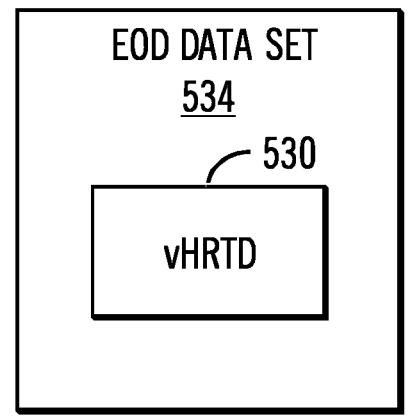
FIG. 5A
PRIOR ART
FIG. 5B
PRIOR ART

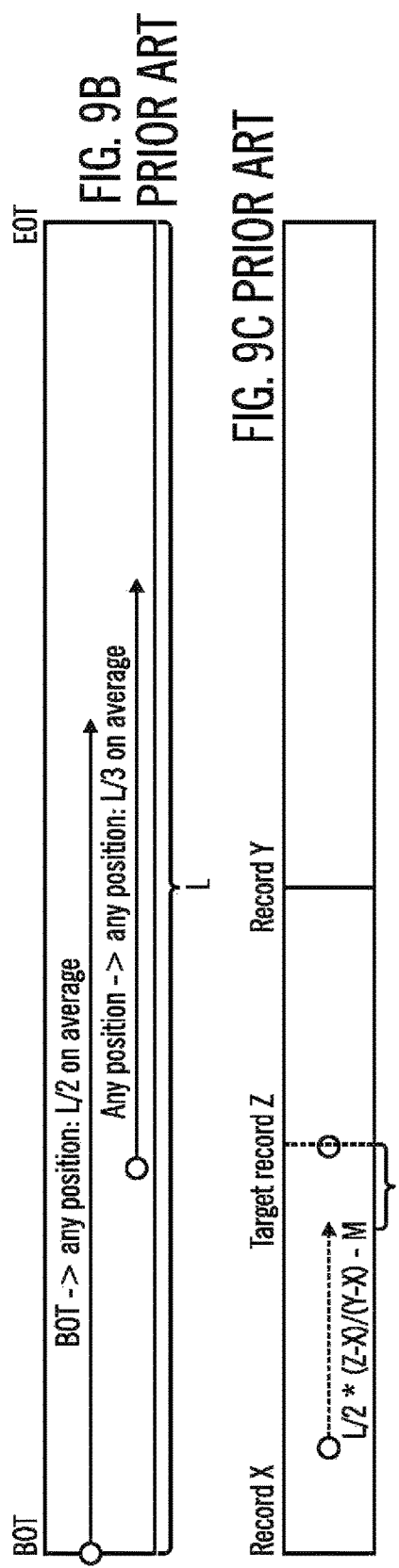
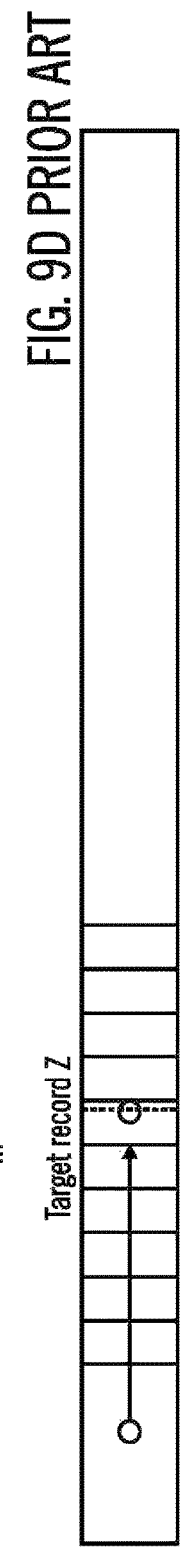
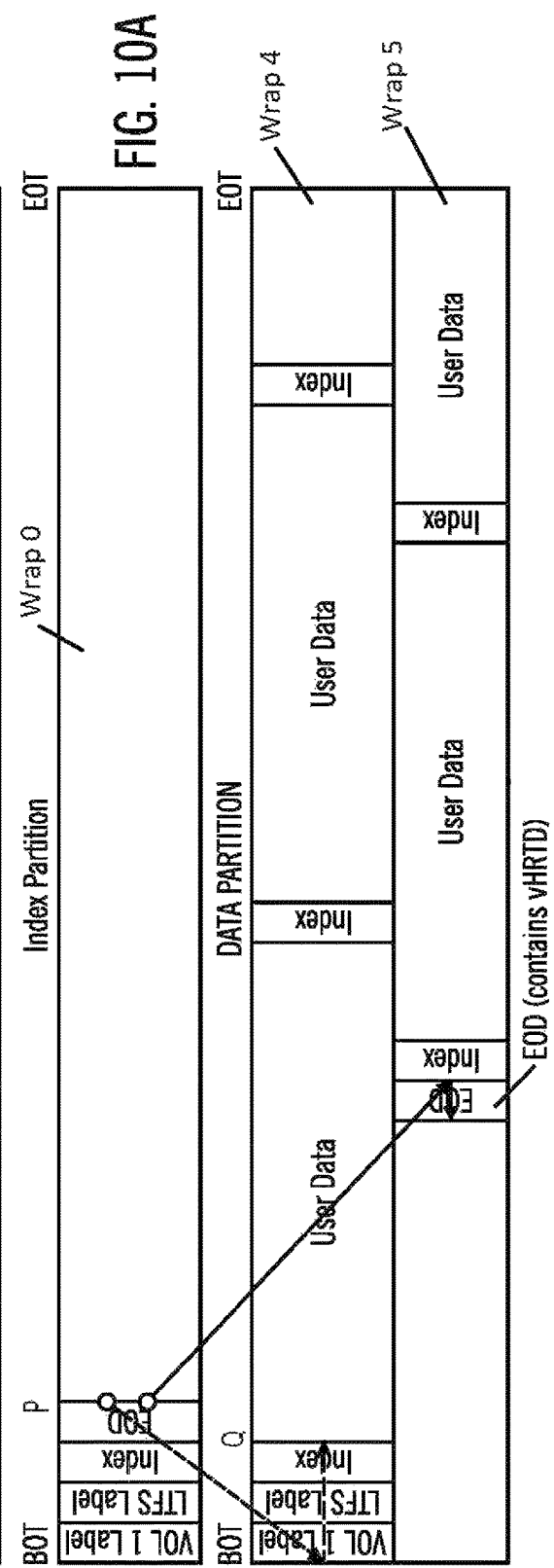

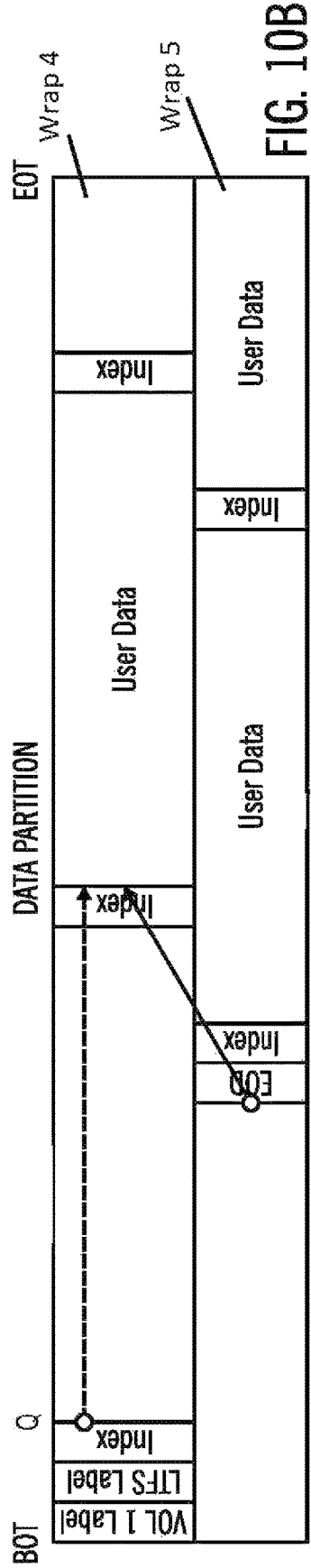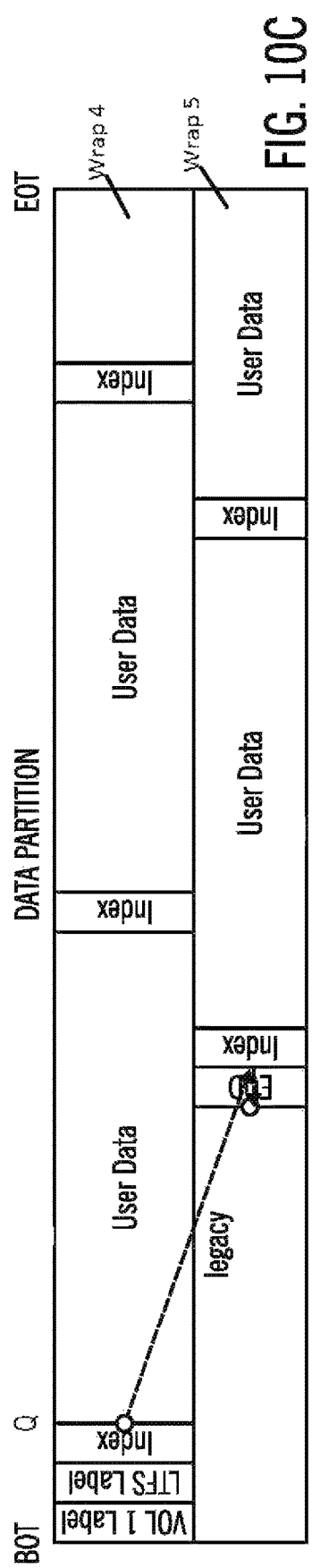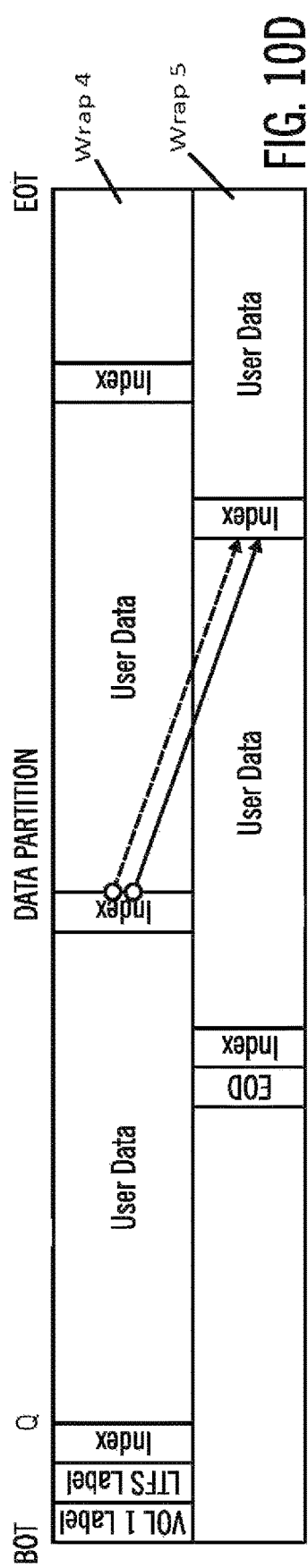

TAPE REPOSITION MANAGEMENT IN A TAPE DATA STORAGE DRIVE

BACKGROUND

The present disclosure relates to a computer program product, system, and method for managing tape repositioning in a tape data storage system.

Computer systems may include data storage systems to process and store data. Historically, data has been stored on local storage devices, such as hard disk drives (HDDs), solid state storage, and removable media such as compact discs (CDs) and digital versatile discs (DVDs). In addition, magnetic tape ("tape") data storage systems are widely used to store digital data. Tape data storage systems provide increased data storage space and longevity, for reduced costs. Modern magnetic tapes are commonly packaged in tape cartridges or cassettes. A tape appliance or a tape drive is a device that performs writing or reading of digital data from the tape.

Digital data may be written on tapes of different lengths and widths. One of the standards that defines tape properties is a LINEAR TAPE OPEN® (LTO®) standard (Linear Tape Open and LTO and all LTO based trademarks and logos are trademarks or registered trademarks of Hewlett Packard Enterprise, IBM and Quantum and/or their affiliates). The LTO standard defines a raw data capacity, tape partitioning, and speed of reading of uncompressed data. For example, LTO-7 is capable of writing six terabytes of data to a 3150 ft (960 meter) tape with an average speed of 300 MB/Sec.

Tape partitioning is a creation of one or more regions (data bands) on a magnetic tape so that an operating system may manage the data in each region of the tape separately. One of the partitioning standards that was adopted by the LTO is a Linear Tape File System (LTFS). The LTFS standard formats a tape in a special way that allows access of all recorded file metadata first and therefore allows viewing the files and directories on the tape directly after mounting of the tape cartridge. In addition, due to LTFS standard being adopted by many operating systems, the files can often be viewed by the operating system without any additional software. Thus, files can be accessed and used as if the tape drive is a hard disk drive (HDD) or a removable flash drive file system. For example, the user is typically permitted to manage and store files in folders (directories), copy, rename and delete files, use drag and drop and copy and paste functionality without reading all the data recorded on the tape.

The LTFS format defines at least two partitions on a tape that comprise a data band. One partition, known as an Index Partition (IP), is used to store the metadata of all the files and folders (henceforth "file", "files") recorded on a tape. For example, the index partition may include data identification (i.e. file or folder), a file user identifier, file name, length of the data, attribute, timestamp, partition identification, start block, byte offset, byte count, file offset, and other metadata. The other partition is a Data Partition (DP), where content of the files is stored including file body and file metadata. In the LTFS standard, file content is typically appended to the end of the tape (free space) such that deletion of files does not free up space on the tape.

In one known tape standard, a HRTD (High Resolution Tape Directory) data structure is stored in a data set called the housekeeping data set defined before the first user data area of the tape and is read when the tape is loaded. As used herein, the term "data set" also includes a "dataset" which may have particular requirements. In a known tape drive, there are three types of physical objects recorded on the tape, that is, a normal dataset, an End of Data (EOD) dataset and the aforementioned housekeeping data set. Data sets typically have a fixed length. The normal data set and the EOD data set are written to the user area of tape whereas the housekeeping data set is written outside of the user area of tape.

In a known tape drive there are two types of logical objects recorded on the tape. One type is a record and the other is a file mark. (also often referred to as a "filemark"). A file mark is a data structure which delimits an area or subarea of a file which is composed of an arbitrary number of records. The HRTD divides a tape into many subareas and identifies the records in each subarea to facilitate rapid access to particular files or records specified by an application access request. Both logical objects (file mark and record) are packed to a normal data set.

Another known tape standard does not permit recordation of an HRTD in a housekeeping data set. However, it is known to record a virtual high resolution tape directory (vHRTD) in an end of data (EOD) data set of a data partition of such tapes. The vHRTD is typically read in connection with an application requested write operation which appends new data after the EOD data set of the data partition. A vHRTD, like an HRTD, divides a tape into many subareas and identifies the records in each subarea to facilitate rapid access to particular files or records specified by an application access request, once the vHRTD becomes available to assist in such accesses. The EOD data set is typically written as the last data set of a tape write operation and thus is positioned after the last logical object, record or file mark on the tape. Accordingly, in some known drives, the EOD data set indicates that no data follows after the last written EOD data set.

SUMMARY

Provided are a computer program product, system and method for repositioning a tape in a data storage system having a tape drive for use with a tape having in one embodiment, a linear tape file system (LTFS), an index partition and a data partition, in which the tape drive has a memory and is resident in a enterprise computer system. In one aspect of tape repositioning management in accordance with the present description, in response to loading a tape in the tape drive, mounting the tape LTFS is initiated including reading an index partition on the tape to extract metadata for mounting the tape LTFS, and prior to accessing a data area of the tape in response to any application access request, the tape is repositioned within the data partition to read a vHRTD (virtual High Resolution Tape Directory) recorded in an EOD (End of Data) portion of the data partition. The EOD portion is read to retrieve the vHRTD to facilitate application requested accesses to the tape. Accordingly, in one embodiment, after reading the EOD portion to retrieve the vHRTD, the reposition management awaits receipt of a first application access request with the vHRTD available to facilitate such application access requests.

In another aspect, repositioning the tape within a data partition to read a vHRTD (virtual High Resolution Tape Directory) recorded in an EOD (End of Data) portion of the data partition, is initiated immediately after reading the index partition on the tape to extract metadata for mounting the tape LTFS. In one embodiment, the tape reposition management includes expanding the vHRTD retrieved from the EOD portion, in a memory of the system. Accordingly, in one embodiment, the EOD portion is read to retrieve the vHRTD prior to processing any application access request so that the vHRTD is available to facilitate application access requests when processed.

In yet another aspect, tape reposition management in one embodiment, includes bypassing repositioning and stopping the tape at the beginning of a data partition after reading the index partition containing meta information for mounting the tape LTFS. Instead, repositioning proceeds directly to repositioning the tape to a data set having the vHRTD after reading the index partition containing metadata for mounting the tape LTFS.

In one embodiment, the tape conforms to an LTO (Linear Tape-Open standard and lacks a high resolution tape directory (HRTD) recorded in a housekeeping data set of the tape.

In another aspect, tape reposition management includes extracting file system metadata as the index partition is read concurrently with repositioning the tape to the data set having the vHRTD.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 5A illustrates a known tape housekeeping data structure in which a high resolution tape directory (HRTD) is recorded;

FIG. 5B illustrates a known tape end of data (EOD) data structure in which a virtual high resolution tape directory (vHRTD) is recorded;

FIGS. 9B-9D illustrate known examples of repositioning a tape in a tape drive.

FIGS. 10A-10D illustrate examples of repositioning a tape in a tape drive employing tape reposition management in accordance with the present description in comparison to known examples of repositioning a tape in a tape drive;

DETAILED DESCRIPTION

Figure 1A:
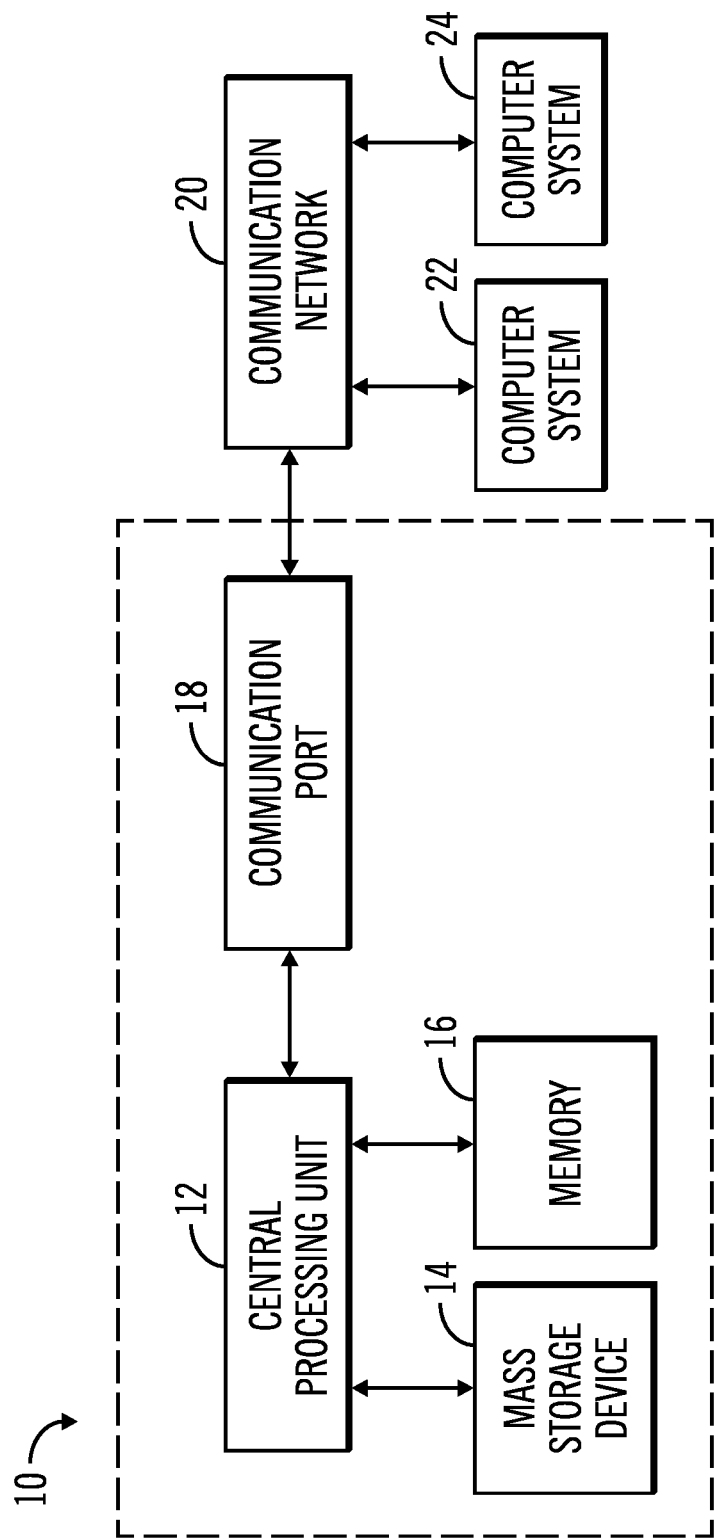
FIG. 1A illustrates an embodiment of a computing environment employing an aspect of tape reposition management in accordance with the present description.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Tape reposition management in accordance with the present description provides a significant improvement to computer technology. For example, in a known computer system, after reading an index partition on the tape to extract metadata for mounting the linear tape file system (LTFS), the tape is repositioned to the beginning of the data partition following the index partition which was read to extract the LTFS metadata. Once the beginning of the data partition is reached, the tape is stopped to await any application access requests. As a result, a vHRTD (virtual High Resolution Tape Directory) is not available to facilitate rapid tape accesses in response to tape access requests by an application which are directed to particular records or files on the tape.

In one aspect of tape repositioning management in accordance with the present description, in response to loading a tape in a tape drive, mounting the tape linear tape file system (LTFS) is initiated including reading an index partition on the tape to extract metadata for mounting the tape LTFS, and the tape is repositioned to an EOD (End of Data) portion of a data partition having a vHRTD (virtual High Resolution Tape Directory) recorded in then EOD (End of Data) portion of the data partition. The EOD portion is read to retrieve the vHRTD to facilitate later received application requested accesses to the tape. Thus, in one embodiment, the vHRTD is retrieved prior to receipt of any application access requests and thus prior to accessing a data area of the tape in response to any application access request. In one embodiment, the known process of repositioning and stopping the tape at the beginning of the data partition after reading the index partition containing metadata is bypassed. Instead, the tape is repositioned to immediately retrieve the vHRTD prior to application access requests. As a result, the vHRTD tape directory is readily available to facilitate rapid tape accesses to particular files or records specified in application access requests.

Aspects of tape management in accordance with the present disclosure, as appreciated by one skilled in the art, may be embodied as a system, method, or computer product. Accordingly, aspects of the present disclosure may take the form of an embodiment combining software (including firmware, resident software, micro-code, etc.) and hardware aspects all generally be referred to as a "module", "method" or "system." Furthermore, aspects of the present disclosure take the form of a computer program product embodied in one or more computer-readable medium(s) having computer-readable program code/instructions embodied thereon including controllers, micro-controllers or computer processing units.

Various aspects of the present disclosure are described below with reference to flowchart illustrations and/or block diagrams of methods, apparatus (system) and computer program products. Turning to FIG. 1A, an example of a computer system 10 is depicted in which aspects of an embodiment of the present disclosure may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). In the illustrated embodiment, the mass storage devices 14 include a tape data storage system.

Memory device 16 may include such memory as random access memory (RAM), electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 1B:
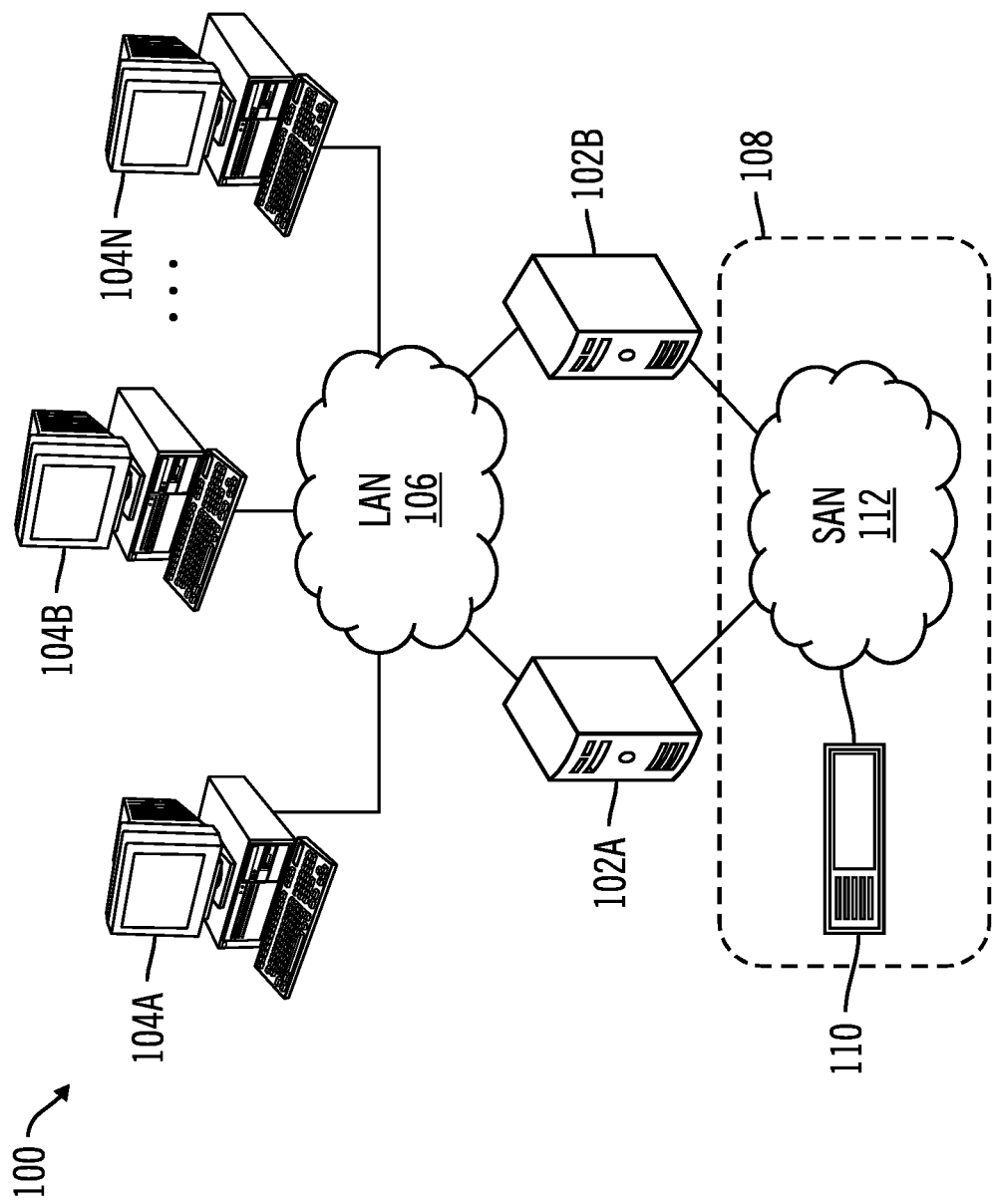
FIG. 1B illustrates a high-level block-diagram representation of an enterprise computer system including a tape storage drive apparatus in which tape reposition management in accordance with the present description may be employed.

FIG. 1B is a high-level block-diagram showing a representation of an enterprise computer system including a tape data storage system in which aspects of an embodiment of the present disclosure may be realized. Examples of enterprise-wide applications include, without limitation, payroll, warehouse, transportation, and batch jobs. Enterprise computer system 100 of FIG. 1B comprises a number of host data processing systems (e.g., server data processing systems 102A, 102B and associated client data processing systems 104A, 104B . . . 104N), which are communicatively coupled together via a first network interconnect (e.g., local area network or "LAN" interconnect 106) as shown. Server data processing systems 102A, 102B of the depicted embodiment are further coupled to a storage subsystem 108 including a number of data storage devices and a second network interconnect (e.g., storage area network or "SAN" interconnect 112). One or more of the server data processing systems 102A, 102B, client data processing systems 104A, 104B . . . 104N, and storage system 108 may be configured for reposition management in accordance with the present description.

In the exemplary embodiment of FIG. 1B, storage system 108 is depicted as including tape data storage system as represented by the tape data storage system 110. In alternative embodiments, storage system 108 may further include any number and type of data storage devices (e.g., individual disk drives, tape drives, disk arrays, tape arrays, RAID array subsystems, robotic tape libraries, filers, file servers) communicatively coupled together and to server data processing systems 102A, 12B via a storage interconnect (SAN interconnect 112), such as a fiber channel (FC) switch, switch fabric, arbitrated loop, or the like. Server data processing system 102A of the embodiment of FIG. 1 comprises an application server (e.g., a database server) to provide core operational functionality to one or more of client data processing systems 104A-104N (where "N" is a positive integer) and server data processing system 102B comprises another server (e.g., a cluster failover server, load-balancing server, backup server, or the like).

Tape data storage system 110 of the depicted embodiment is coupled to SAN interconnect 112 via a communication link as shown. Each communication link may comprise any of a number of communication media capable of transmitting one or more electrical, optical, and/or acoustical propagated signals (e.g., copper wiring, fiber optic cable, or the like) between SAN interconnect 112 and a communication port of tape data storage system 110.

In the illustrated embodiment, one or both of the tape data storage system 110 and server data processing system 102A are configured with sufficient functionality to employ tape reposition management in accordance with the present description, to control and/or manage the tape repositioning and access provided to data of a tape data storage medium within a tape cartridge coupled with tape data storage device 110 as will be further described herein. However, it is appreciated that one or more of the computer systems 10, 22, 23 (FIG. 1A), server data processing systems 102A, 102B (FIG. 1B), client data processing systems 104a, 104b . . . 104n, and data storage system 108, may be configured to employ reposition management in accordance with the present description.

While a conventional SAN-type interconnect (SAN interconnect 112) has been specifically depicted in the embodiment of FIG. 1, other interconnects (e.g., direct connection, local, metropolitan, and/or wide-area networks) and other protocols (e.g., FICON, ESCON, SSA, or the like) may be utilized. Moreover, while a particular number and arrangement of elements have been illustrated with respect to enterprise 100 of FIG. 1B, it should be appreciated that embodiments of the present disclosure are not limited to enterprises, systems, or data storage devices having any particular number, type, or arrangement of components and so may encompass a wide variety of system types, architectures, and form factors.

Figure 2:
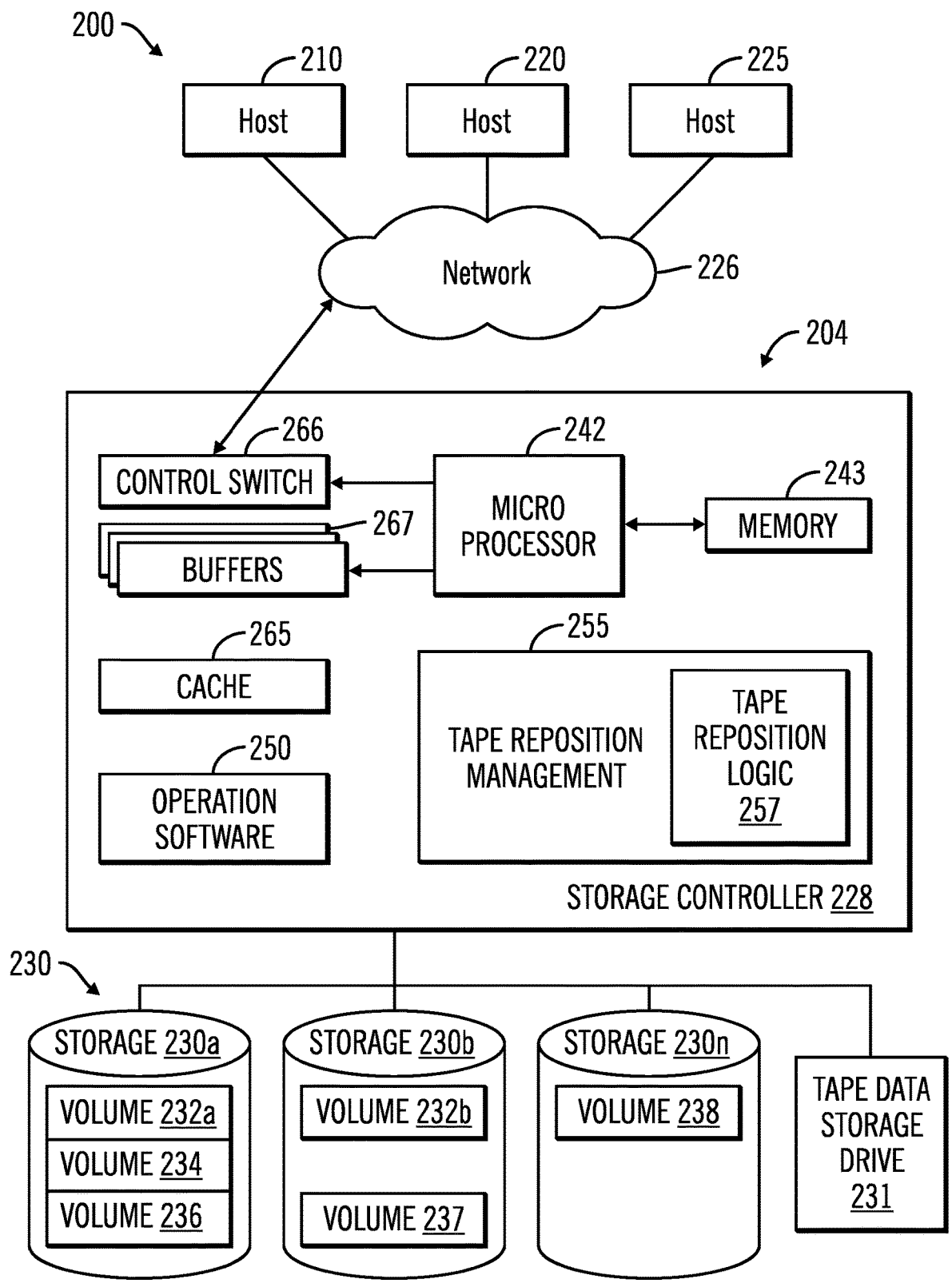
FIG. 2 illustrates an exemplary block diagram of a hardware and software structure of a data storage system in a computer system in which tape reposition management in accordance with the present description may be employed.

In an alternative embodiment, FIG. 2 is an exemplary computer system 200 showing a hardware and software structure of a data storage system 204 in which aspects of tape reposition management in accordance with the present description may be realized. Host computers 210, 220, 225, are shown, each acting as a central processing unit for performing data processing as part of the computer system 200 which includes a data storage system 204. The hosts (physical or virtual devices), 210, 220, and 225 may be one or more physical devices or logical devices to accomplish the purposes of an embodiment of the present disclosure. In one embodiment, by way of example only, a data storage system 204 may be implemented as IBM® System Storage™ DS8000™ which has been modified to employ tape reposition management in accordance with the present description.

A Network connection 226 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter to the storage controller 228, such as Fibre channel, FICON, ESCON, Ethernet, fiber optic, wireless, or coaxial adapters. Data storage system 204 is accordingly equipped with a suitable fabric (not shown in FIG. 2) or network to communicate. Data storage system 204 is depicted in FIG. 2 comprising storage controller 228, and storage 230 including tape data storage drive 231 controlled by the storage controller 228.

Storage 230a, 230b . . . 230n of storage 230 may be physically comprised of one or more storage devices, such as storage arrays. A storage array is a logical grouping of individual storage devices, such as a hard disk or a tape data storage drive. In certain embodiments, one or more of storage 230a, 230b . . . 230n is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request. Moreover, the tape data storage device 110 (see FIG. 1B), as described in FIG. 1B and FIG. 3, may be implemented with the architecture described in FIG. 2.

In one embodiment, by way of example only, the storage system as shown in FIG. 2 may include a logical volume, or simply "volume," and may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b and a full volume 237. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

To facilitate a clearer understanding of aspects of the present disclosure, storage controller 228 is shown in FIG. 2 as a single processing unit, including a microprocessor 242, system memory 243 which may include nonvolatile storage ("NVS") described in more detail below. It is noted that in some embodiments, storage controller 228 is comprised of multiple processing units, each with their own processor complex and system memory, and interconnected by a dedicated network within data storage system 204. In some embodiments, the devices included in storage 230 may be connected in a loop architecture.

Storage controller 228 manages storage 230 and facilitates the processing of write and read requests intended for storage 230. The system memory 243 of storage controller 228 stores program instructions and data, which the processor 242 may access for executing functions and methods of an embodiment of the present disclosure for executing and managing storage 230 as described herein. In one embodiment, system memory 243 includes, in association with, or in communication with the operation software 250, tape reposition management 255 for performing methods and operations employing reposition management in accordance with the present description. One aspect of the tape reposition management 255 is to control tape reposition logic 257 which controls the position of the tape of a tape data storage drive 231 FIG. 3). Although the tape reposition logic 257 is depicted as a component of the tape reposition management 255, it is appreciated that the tape reposition logic 257 may be located in other components of the system such as one or more of the storage controller 228, a host 210-225, network 226, and tape storage drive 231. In a similar manner, although the logic of the tape management 255 is depicted as a component of the storage controller 228, it is appreciated that the tape reposition management 255 may be located in other components of the system such as one or more of the tape storage drive 231, a host 210-225, and a network 226. Thus, tape reposition management 255 may be implemented with one or more of hardware, software, and firmware, alone or in combination.

As shown in FIG. 2, system memory 243 may also include or be in communication with a cache 265 for storage 230, also referred to herein as a "cache memory", for buffering "write data" and "read data", which respectively refer to write/read requests and their associated data. In one embodiment, cache 265 is allocated in a device external to system memory 243, yet remains accessible by microprocessor 242 and may serve to provide additional security against data loss, in addition to carrying out the operations as described in herein.

In some embodiments, cache 265 is implemented with a volatile memory and nonvolatile memory and coupled to microprocessor 242 via a local bus (not shown in FIG. 2) for enhanced performance of data storage system 200. An NVS portion of the memory 243 included in data storage controller is accessible by microprocessor 242 and serves to provide additional support for operations and execution of an embodiment of the present disclosure as described in other figures. The NVS may also referred to as a "persistent" cache, or "cache memory" and is implemented with nonvolatile memory that may or may not utilize external power to retain data stored therein. The NVS may be stored in and with the cache 265 for any purposes suited to accomplish the objectives of an embodiment of the present disclosure. In some embodiments, a backup power source (not shown in FIG. 2), such as a battery, supplies NVS with sufficient power to retain the data stored therein in case of power loss to data storage system 200. In certain embodiments, the capacity of NVS is less than or equal to the total capacity of cache 265.

The storage controller 228 includes a control switch 266 for controlling the communication protocol such as a fiber channel protocol, for example, to the host computers 210, 220, 225. Buffers 267 assist the cache 265 in temporarily storing (buffering) read and write data.

Figure 3:
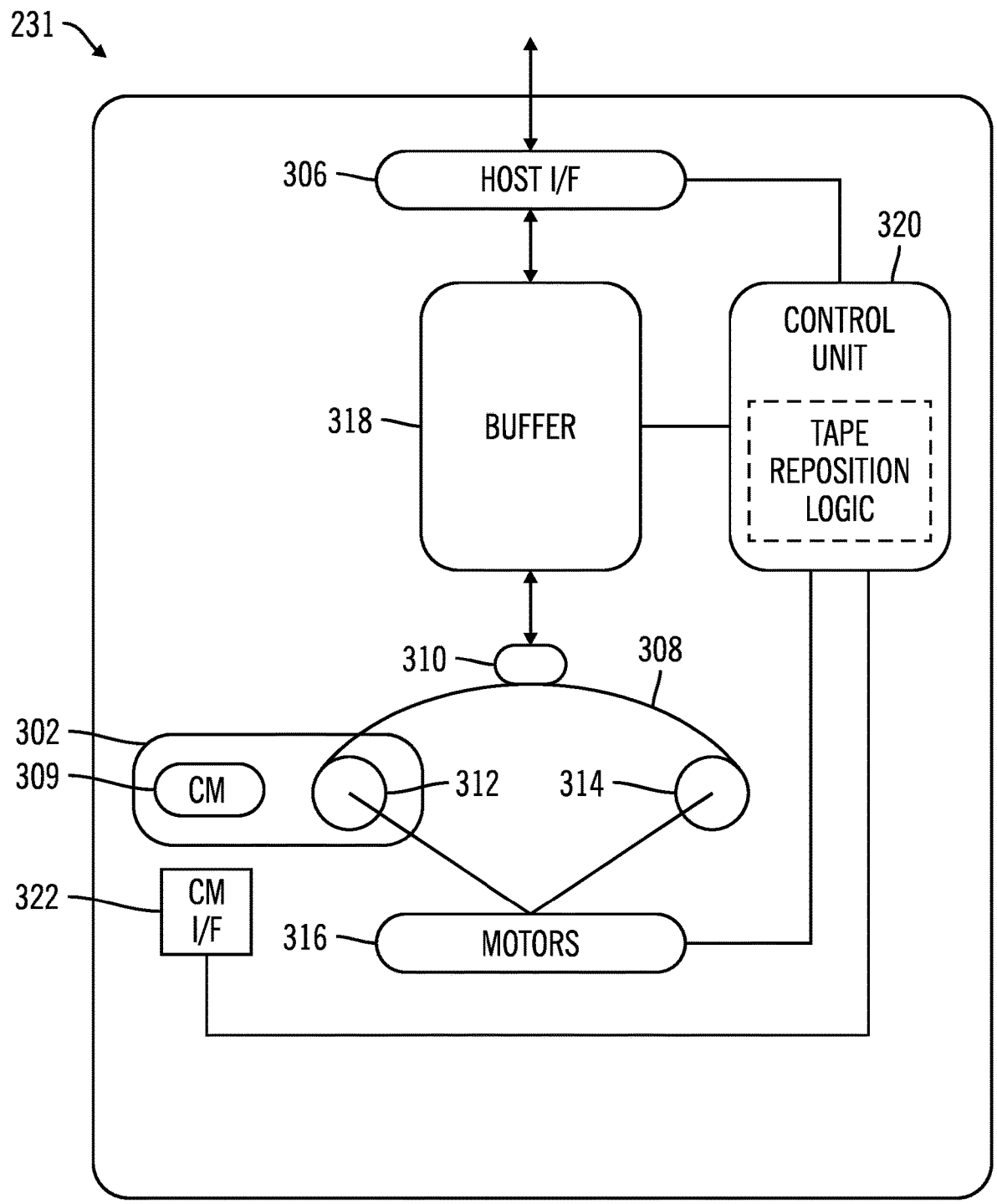
FIG. 3 illustrates an exemplary block diagram of a tape storage drive apparatus in which tape reposition management in accordance with the present description may be employed.

FIG. 3 is a block diagram depicting one embodiment of a tape data storage drive 231 in which aspects of tape reposition management in accordance with the present description may be employed. The tape data storage drive 231 comprises a removable data storage tape cartridge 302 and a communication interface (e.g., host data processing system interface (I/F) 306) to communicatively couple tape data storage drive 231 to the storage controller 228 (FIG. 2) or alternatively, one or more host data processing systems or associated communication channels (e.g., SAN interconnect 112).

The communication I/F 306 is configured to receive input/output (I/O) operation requests (e.g., "read" and/or "write" requests), and process such requests in an appropriate manner to control or "manage" access to a tape data storage medium 308 (e.g., magnetic tape) of removable data storage tape cartridge 302 as described herein. In addition to tape data storage medium 308, data storage tape cartridge 302 comprises a cartridge memory (CM) module 309 which in one embodiment, includes a passive, contactless silicon storage device utilized to store data about the tape cartridge 302 in which it resides. Exemplary data may include, for example, data indicating the associated tape cartridge's volume serial number (VOLSER), the "type" of data storage medium within the cartridge, data format type and the data, if any, which is stored thereon.

Tape data storage medium 308 of removable data storage tape cartridge 302 is routed in proximity to a tape access (e.g., read/write) head 310 utilizing media transport reels 312 and 314 and one or more media transport motors 316 as shown. The tape access head 310 is configured to read data from and write data to tape data storage medium 308 and to temporarily store or "stage" such data within a buffer 318 (e.g., one or more "read-ahead" or staging buffers).

When writing data on a tape 308 (FIG. 3) or reading data from a tape 308, the tape 308 is moved relative to the read/write head 310 to the position of the data to be written or read in advance. The process of moving to the target data position is typically referred to as a "reposition" process and is performed in response to a reposition request issued by a storage controller.

In an example embodiment, tape cartridge 302 meets the standard specifications of one or more of Linear Tape Open (LTO) generation standards, such as, for example, LTO-7. In such an embodiment, supply reel 312 may be a part of the LTO tape cartridge and connected to beginning of the tape 308, and the end of tape 308 is connected to a leader pin (not shown) which is mechanically grasped by features (not shown) of tape data storage drive 231 and threaded onto take-up reel 314.

A control unit 320 includes read logic and write logic for reading data from and writing data to the tape of the tape storage drive. Thus, the control unit 320 controls and manages data flow, formatting, and data storage subsystem operation via control signals issued to one or more of communication I/F 306, buffer 318, media transport motors 316, and/or CM I/F 322 utilized to access (read or write) data stored in CM 309.

In the illustrated embodiment some or all of the functions of the tape reposition logic 257 (FIG. 2) may be located within the control unit 320 of the tape storage drive 231. In another embodiment, such control functionality may be incorporated into one or more of other components of the tape data storage drive 231. In a similar manner, although the control unit 320 is depicted in FIG. 3 as a part of a tape storage drive 231, it is appreciated that logic of the control unit may be located in one or more of various components of the system such as one or more of the storage controller 228, a host 210-225, and network 226, as well as the tape storage drive 231. Alternatively, some or all of the component functions may be implemented in hardware devices, such as in Application Specific Integrated Circuits (ASICs), Field Programmable Gate Array (FPGA) or executed by separate dedicated processors.

The memory 106 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

The storage 108 may comprise different types or classes of storage devices of the SAN 112, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in the storage 108 may further be configured from an array of devices, such as Just a Bunch of Disks (JBOD), Direct Access Storage Device (DASD), Redundant Array of Independent Disks (RAID) array, virtualization device, etc. Further, the storage 108 may comprise heterogeneous storage devices from different vendors and different types of storage devices, such as a first type of storage devices, e.g., hard disk drives, that have a slower data transfer rate than a second type of storage devices, e.g., SSDs.

The storage 108 may comprise a cloud storage system provided by a cloud storage service provider. Examples of cloud storage service providers include DropBox®, Google® Drive, Amazon Cloud Drive®, Amazon® S3, IBM® Cloud Object Storage System™, etc. (Dropbox is a registered trademark of Dropbox, Inc., Google is a registered trademark of Google, Inc., Amazon and Amazon Cloud Drive are trademarks of Amazon Technologies, Inc.; and IBM and Cloud Object Storage System are trademarks of IBM throughout the world).

The network 106 may include, without limitation, a Storage Area Network (SAN), Local Area Network (LAN), Intranet, the Internet, Wide Area Network (WAN), peer-to-peer network, wireless network, and arbitrated loop network. Accordingly, the enterprise computer system 100 includes a storage system 108 coupled to a server 102 through a network 112.

Figure 4:
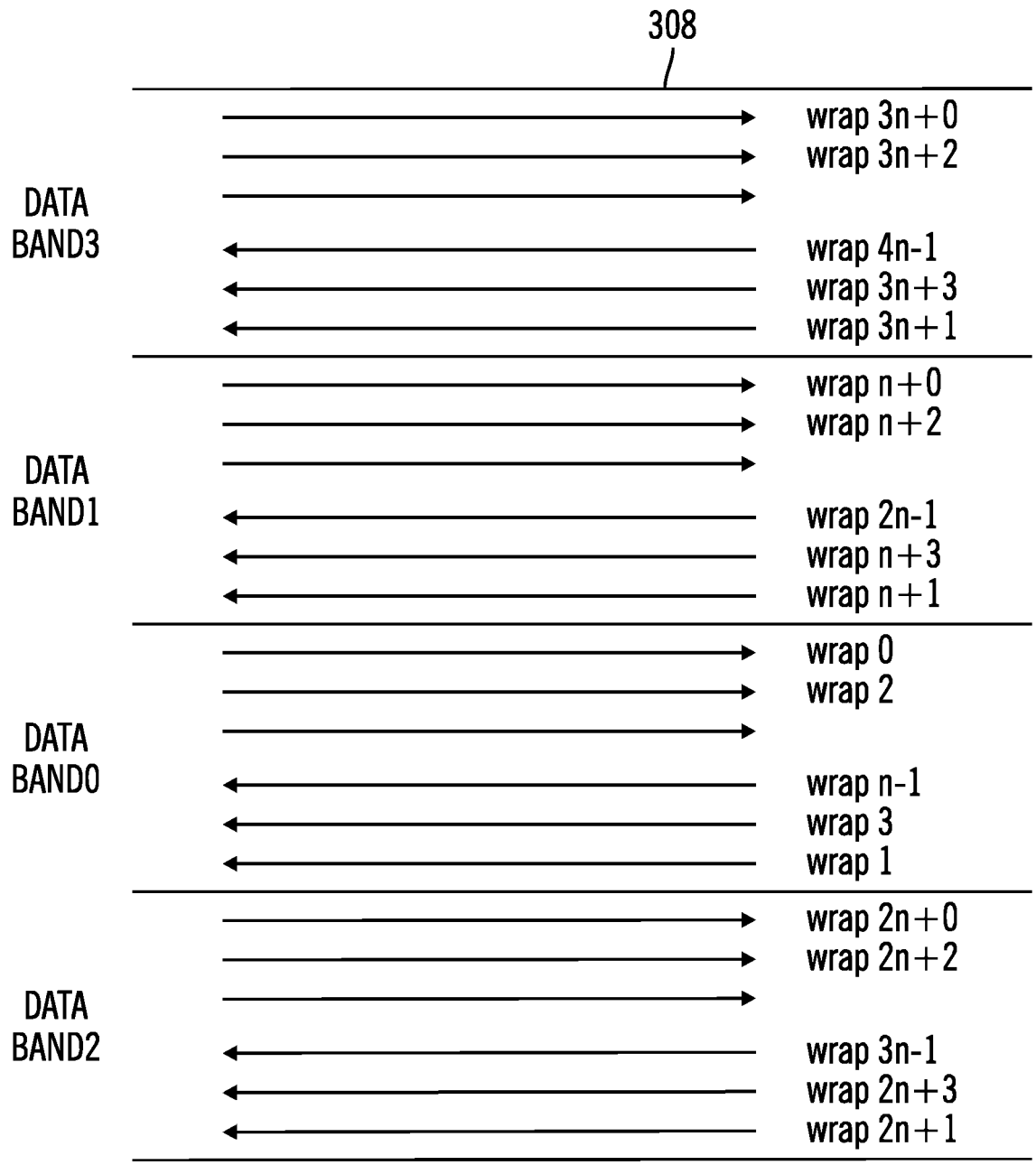
FIG. 4 illustrates a known band structure of a tape in a tape storage drive system.

In the illustrated embodiment, the tape data storage drive 231 is a linear system in which the width direction of the tape is divided into a plurality of areas (wraps) in a conventional manner as shown in FIG. 4. The data is recorded from the beginning to the end and from the end to the beginning of the tape in the tape length direction represented by an arrow for each wrap. The width of the area in the tape width direction in which valid data for each wrap is written is called a track width (track pitch Wtp). As shown in FIG. 4, recording is performed on the track while traveling from the beginning to the end (forward) in the even wrap, and recording is performed while traveling from the end to the beginning (backward) in the odd wrap. In one known tape standard, a HRTD (High Resolution Tape Directory) data structure 510 (FIG. 5A) is stored in a tape portion called the House Keeping data set 514 defined before the first user data area of the tape and is read when the tape is loaded.

For example, an LTFS magnetic tape medium wrap allocation in accordance with the LTO-7, standard, a magnetic tape may have 112 wraps allocated to four data bands, (data band0-band3) where each band has 28 wraps, that is, data band0 has 28 wraps $wrap_0$-$wrap_{n-1}$, data band1 has 28 wraps $wrap_{n+0}$-$wrap_{2n-1}$, data band2 has 28 wraps $wrap_{2n+0}$-$wrap_{3n-1}$, and data band3 has 28 wraps $wrap_{3n+0}$-$wrap_{4n-1}$. All the data wraps may be formatted into a single partition from wrap 0 to wrap 111 or for example, Other formats may be used, depending upon the particular applications. For example, one known LTFS standard may divide the tape into two partitions in which a first partition includes wraps 0-1 that may be used for metadata and a second partition includes wraps 4-111 for data retention associated with the metadata. For example, an LTFS typically creates a 2-partition tape when formatting the tape. Wrap 0 and wrap 1 are used to provide an Index Partition. Wrap 2 and wrap 3 are typically used as guard bands. From wrap 4 to the last wrap, a Data Partition is provided for storing user data which may be constructed with standard records of the tape drive system.

As previously mentioned, LTO-7 standard is capable of writing six terabytes of data to a 3150 ft (960 meter) tape. A physical location in both directions defined by the length of the tape and expressed in longitudinal position counter (LPOS), where LPOS represent longitudinal position that is used by the servo motors to locate a specific data on the tape. Any new piece of data is typically only appended to the tape, thus written to the tape at the next LPOS location of a previously written data.

An average seeking speed to locate a specific data on a tape is around 32.8 ft/sec (10 m/sec), therefore it takes about 96 seconds for a head of a tape drive to move from the beginning to the end of the tape. Assuming the requested file is located in the range between the beginning of the tape to the end of the tape, the average travel time to access is around 32 seconds (⅓ of the 96 seconds). This estimate does not take into account that data is recorded in different directions depending on the wrap, and switching directions and repositioning of the head takes additional time. As such, it may be advantageous to, among other things, implement a system that reduces the travel time of the head in order to locate and read the requested data in a shortest timeframe. An embodiment of tape reposition management in accordance with the present description, provides a system, a method, and a program product for facilitating searches for recorded files on a magnetic tape.

Figure 6:
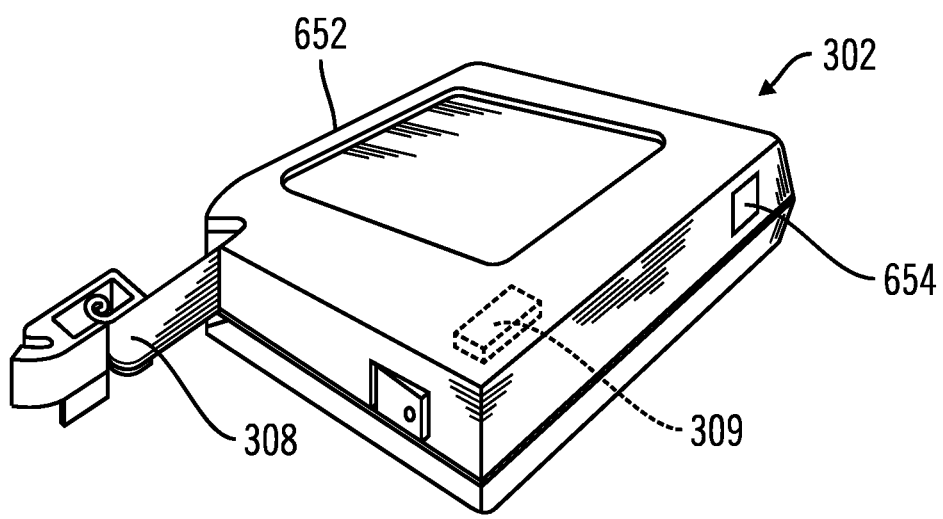
FIG. 6 illustrates an example of a tape cartridge which may be employed in the tape storage drive apparatus of FIG. 3.

FIG. 6 illustrates an example embodiment of a tape cartridge 302 suitable for use with a tape data storage systems such as tape data storage drive 231 shown in FIG. 3. According to an example embodiment, tape cartridge 302 includes housing 652, magnetic tape medium 308 ("tape") in housing 652, and cartridge memory 309 coupled to housing 652. In other embodiments, cartridge memory 309 may be embedded inside housing 652. In further embodiments, cartridge memory 309 may be attached to the inside or outside of housing 652 without modification of housing 652. The cartridge 302 may also have identifying indicia 654 in or on the housing 652.

According to an example embodiment, controller 320 (FIG. 3) uses cartridge memory 309, via cartridge memory reader or interface 322, as a temporary storage for information about data that is to be written in both running directions of magnetic tape medium 308, such as a generation value of LTFS indexes. In further embodiments, cartridge memory 309 may store information regarding tape partitioning, and other information regarding using of the magnetic tape medium 308 such as a tape directory (TD) for example.

Figure 7A:
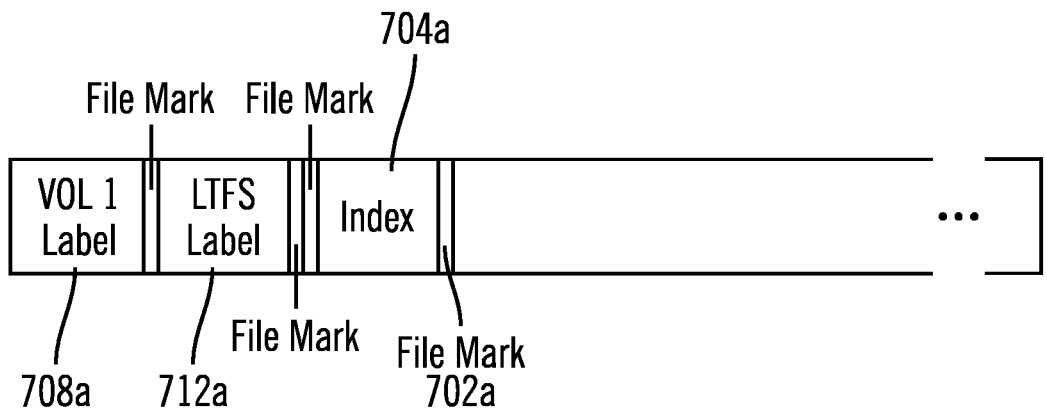
FIG. 7A illustrates an example of a tape having known labels and an index partition.

In known tape data storage drive systems, a tape reposition request identifies a target location which is identified by a record number of a target record, or a file mark number of a target file mark, an example of which is represented by file mark 702a in FIG. 7A. A file mark is a data structure which delimits an area or subarea of a file which is composed of an arbitrary number of records. However, the precise location of each file mark is typically not available to the storage controller or the tape data storage drive. Typically, read logic in a tape drive storage system does not know precisely where the target record or file mark is written on the tape. Instead, a data structure often referred to as a "Tape Directory (TD)" is frequently used to determine which general area of the tape the target record is located. For example, in an LTO tape drive, one wrap is divided into two subareas. In such systems, the tape directory identifies which subarea of the two subareas, the target record is located.

By comparison, in known tape drives such as the TS1160 for example, which is marketed by IBM, each wrap is divided into 128 smaller subareas in the tape length direction. In such systems, in addition to the TD data structure, a High Resolution Tape Directory (HRTD) data structure 510 (FIG. 5A) identifies for each record recorded on the tape, the particular subarea of the 128 subareas, in which the target record was recorded. As previously noted, the HRTD (High Resolution Tape Directory) data structure 510 (FIG. 5A) is stored in a tape data portion called the Housekeeping data set 514

Thus, in known systems having HRTD type directories, upon receiving a reposition request to reposition the tape to read a specified target record, the HRTD data structure is examined to identify which particular subarea of the possible 128 subarea, contains the specified target record number or file mark number. In known tape drive systems, the physical location of each HRTD subarea of the tape is known to tape reposition logic. Accordingly, the tape is repositioned by the tape reposition logic to the particular subarea identified by the HRTD data structure. Read logic of the tape drive system then searches records of the data set located in the area in order from the beginning of the area.

Records stored in each area or subarea of the tape are often collectively referred to as a data set. Known tape drive systems utilize a Data Set Information Table (DSIT) which identifies the number of records in the data set which occupies an area of subarea of the tape. The number of file marks in a particular data set is also known as is the file mark number of the file mark at the beginning of the data set. Using the target record number of the specified target record of the target data set, the number of records recorded in the target data set as indicated in the DSIT, and the first file mark number and the number of file marks in the target data set, read logic of a known tape drive can check if the target record is to be found in the target data set. Once the desired record is confirmed to be in the data set being checked, the reposition request is terminated. Accordingly, reading of the data set or data sets is continued until a data set including the desired record is found.

It is appreciated that in tape drive systems which utilize an HRTD data structure in the housekeeping data set of the tape, a specified record may be relatively quickly located since each tape wrap is subdivided into relatively small subareas and the HRTD data structure identifies the records in each such subarea. Thus, a search of a relatively small subarea for a specified record may be completed quickly. On the other hand, the specifications of an LTO tape drive may be defined by a different standard. As a result, a data set such as an HRTD data structure generally cannot be written in the housekeeping data set in known LTO tape drives. To address this issue, known LTO tape drives marketed by IBM create information which is the same or similar to that found in an HRTD data structure. This HRTD type information is recorded as a virtual HRTD (vHRTD) in the free space of a data set called End of Data (EOD) which is typically written last in a data write to the tape. FIG. 5B shows an example of a known vHRTD 530 recorded in an EOD data set 534 of a data partition described below.

However, in known tape drive systems, the EOD data set is not read when the tape is loaded and mounted. As a result, the vHRTD is not read in connection with loading and mounting a tape and thus is not available to facilitate application requested read operations following loading and mounting of a tape. Consequently tape access operations in response to application access requests received after loading and mounting of the tape do not utilize the vHRTD directory for an interval of time following completion of loading and mounting of the tape, However, it is appreciated that eventually an access request may be received from a host, which causes the vHRTD to be read from EOD. Examples of such subsequent access include data being appended from or near the EOD data set being accessed as a result of the host requested access. Until such an access request is received, the vHRTD remains unread, slowing host requested accesses during the intervening period. However, once an access is received which causes the vHRTD to be read, subsequent repositions can be executed at high speed using vHRTD.

Figure 7B:
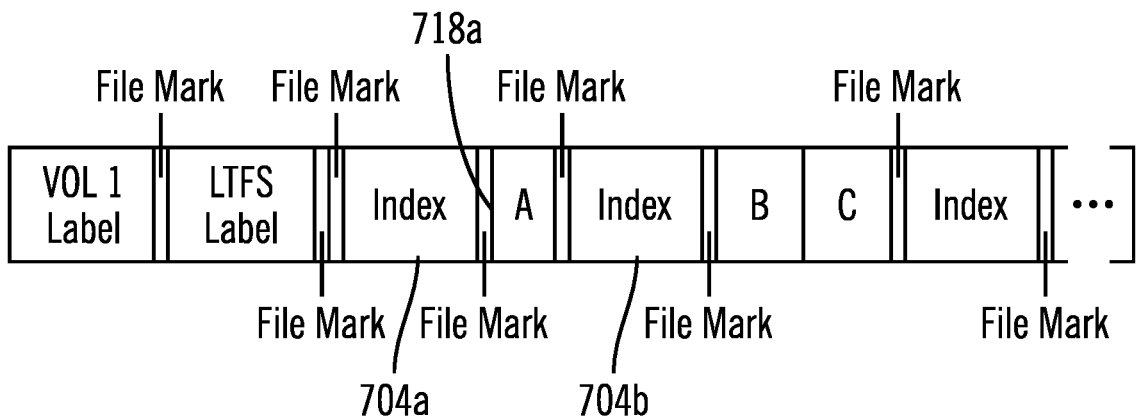
FIG. 7B illustrates an example of a tape having known labels, and index and data partitions.

In a typical Linear Tape File System (LTFS), an area of the tape in which data is recorded as a file on the file system, is often divided into two partitions, a data partition in which user data is stored and an index partition in which file system metadata (such as, for example, file name, location on the data partition where the file is recorded, size, etc.). FIG. 7B shows an example of a user data area "A" of a data partition and an index partition 704b. An example of a known LTFS system is marketed by IBM under the brand name Spectrum Archive.

Upon writing index information to a tape medium, a file mark (FM) data structure defined in the specifications of the LTFS format are typically written before and after the index information. In some embodiments, the file mark is written immediately before or after (i.e., adjacent to) the index information. The file mark facilitates finding index information recorded on the tape medium. The latest index information is recorded in the index partition 704a to reduce the time required to read index information when the tape medium is inserted into the tape drive.

Two additional data structures recorded on an LTFS formatted tape are often referred to as "labels". One such label is a volume label 708a (FIG. 7A) which identifies the tape as volume 1, in this example. Another label is an LTFS label 712a which identifies the tape as being formatted for the LTFS file system.

When a request to mount an LTFS tape is received, the tape to be mounted is loaded into the tape drive, and the VOL1 Label 708a and LTFS Label 712a for the index partition 704a are checked to confirm that the tape is formatted with LTFS format. In addition, the meta information of the file system is extracted to provide the file system with file and directory information written on the tape. Accordingly, the drive moves (repositions) the tape so that the tape drive read head is positioned at a tape location 718a (FIG. 7B) at the beginning of the data partition. As the tape is repositioned to the beginning 718a of the data partition, metadata is read to check the VOL1 Label and LTFS Label. Upon reaching the beginning 718a of the data partition, tape repositioning in known tape drives stops right there in preparation for the first application requested access which is typically a read request or a write request initiated by a user application executing on a host.

Figure 8:
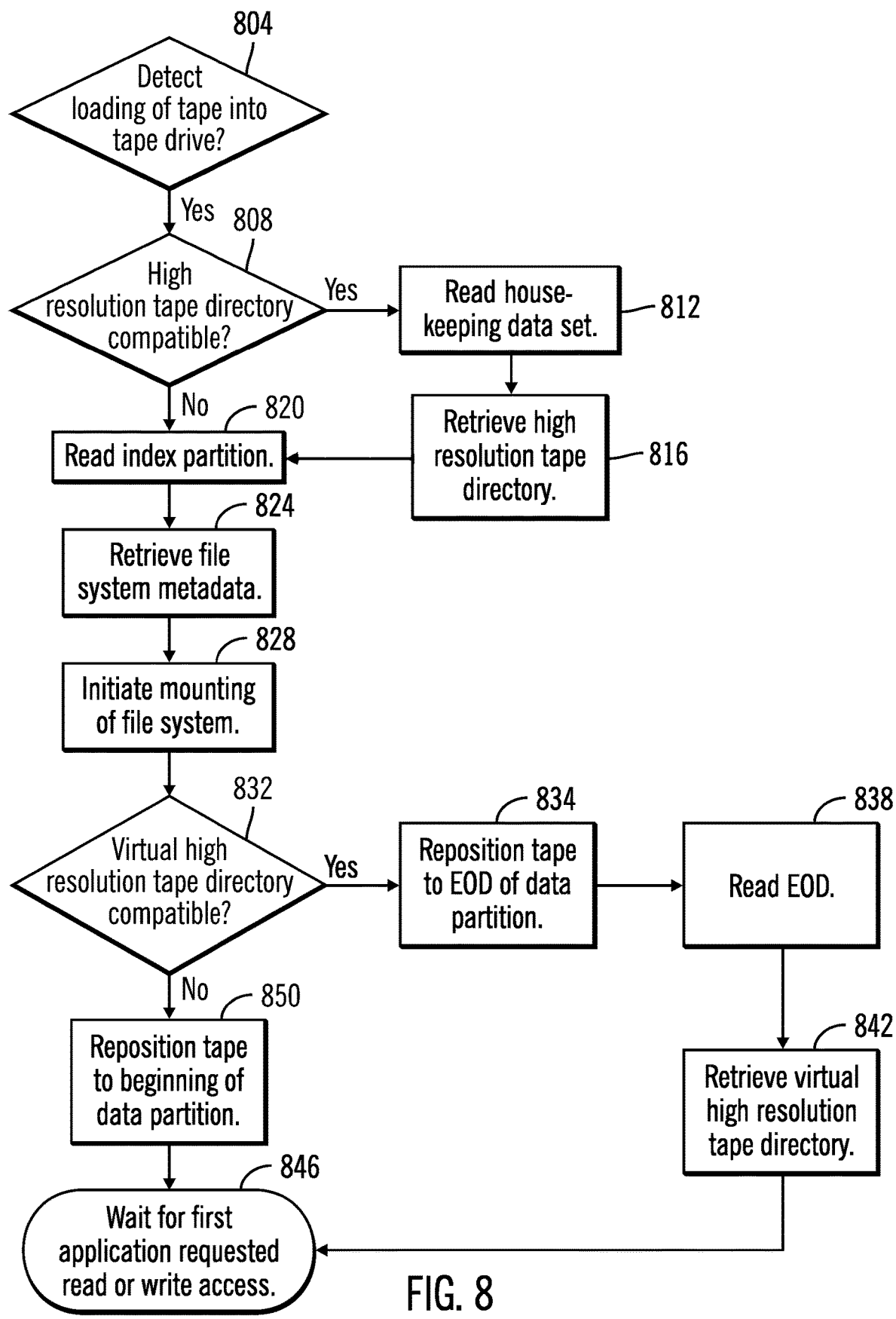
FIG. 8 depicts an example of operations of a computer system employing an aspect of reposition management in accordance with the present description.

It is appreciated herein that terminating repositioning of the tape at the beginning of the tape partition upon completion of the tape mounting process in known tape drives can significantly slow subsequent application requested accesses to the tape because the vHRTD data structure has not been read and therefore is not available to facilitate rapid access to a desired record. FIG. 8 depicts operations of a data storage system employing tape reposition management in accordance with the present description in which the vHRTD is read and made available in connection with the initial mounting of the tape file system in response to insertion of the tape cartridge into the tape drive. As a result, a specified record or file mark of each application requested access may be rapidly located using the vHRTD which was retrieved in connection with the tape cartridge loading and file system mounting.

In this embodiment, the tape reposition management 255 (FIG. 2) and the tape reposition logic 257 and tape cartridge control unit (FIG. 3) controlled by the tape reposition management 255, are configured to perform the operations of FIG. 8 including blocks 840-850 and the accompanying description of FIG. 8. However, it is appreciated that other logic may be configured to perform the operations, depending upon the particular application.

In one embodiment, a tape cartridge such as the tape cartridge 302, FIGS. 3, 6, may be loaded into a tape drive such as the tape drive 231, FIG. 3, by automatic devices. In other embodiments, the tape cartridge may be loaded manually by a user and may employ a suitable user interface of the tape reposition management 255 or may be loaded through a combination of automatic and manual operations.

The tape reposition management 255 detects (block 804, FIG. 48) loading of a tape cartridge into the tape drive system and determines (block 808) whether the cartridge being loaded is compatible with known high resolution tape directories such as the HRTD type tape cartridges. In one embodiment, tape loading operations may be activated automatically through the tape reposition management 255 or units controlled by the tape reposition management 255. In other embodiments, the tape loading or mounting operations may be activated manually through a suitable user interface of the tape reposition management 255 or may be activated through a combination of automatic and manual operations.

Detection of loading of a tape cartridge into the tape drive system may be performed using a variety of techniques including known techniques, for example or using detection techniques which may be subsequently developed. Similarly, determination of whether a tape cartridge being loaded is compatible with high resolution tape directories (HRTD) may be performed using a variety of techniques including known techniques or using detection techniques which may be subsequently developed.

For example, the TS11xx line of tape drives such as the TS1160 marketed by IBM for enterprise level applications, records a high resolution tape directory such as the HRTD 510 (FIG. 5A) in the housekeeping data set of the tape such as housekeeping data set 514 (FIG. 5A) typically located near the beginning of the tape. Thus, by detecting for example, that the cartridge being loaded is a TS11xx type cartridge, or detecting for example, that the tape data storage drive 231 (FIG. 3) controlled by the storage controller 228 (FIG. 2) is a TS11xx type tape data storage drive, it may be determined that the cartridge being loaded has an HRTD recorded in the housekeeping data set of the tape. Other techniques may be used, depending upon the particular application.

For example, the tape data storage drive 231 may be detected by the storage controller 228 as a TS11xx type tape storage drive, for example, when the tape storage drive is coupled to the storage controller and the storage controller and tape drive exchange suitable signals including a signal identifying the tape storage drive as a TS11xx type tape storage drive. In other embodiments, the tape cartridge 302 may have identifying indicia 654 (FIG. 6) which may be electronically or optically scanned for example, to identify the cartridge 302 as a TS1 1xx type cartridge. For example, the indicia 654 may be in the form of a nonvolatile memory embedded inside the housing 652, as shown in FIG. 1B. In other approaches, the nonvolatile memory indicia 654 may be attached to the inside or outside of the housing 652 without modification of the housing 652. For example, the nonvolatile memory may be embedded in a self-adhesive label as represented by the indicia 654. In one approach, the nonvolatile memory of the indicia 654 may be a Flash memory device, read-only memory (ROM) device, etc., embedded into or coupled to the inside or outside of the tape cartridge 302. The nonvolatile memory is accessible by the tape drive and the tape operating software (the driver software), and/or another device using scanning or wireless techniques such as radio frequency identification (RFID) or other wireless or wired techniques. Other techniques may be used to determine HRTD compatibility of the cartridge being loaded, depending upon the particular application including the particular type of cartridge and the particular type of tape drive system.

Having determined (block 808) that the cartridge being loaded is compatible with known high resolution tape directories, the tape reposition management 255 causes the housekeeping data set 514 (FIG. 5A) to be read (block 812, FIG. 8), and the high resolution tape directory (HRTD) 510 recorded there is retrieved (block 816) by the tape reposition management 255. In one embodiment, the standard housekeeping data set (sHKDS) recorded in the housekeeping data portion of the tape is read using known techniques. In addition, using known techniques, the retrieved HRTD is expanded and stored in suitable memory such as memory of the control unit 320 (FIG. 3) of the tape drive 231, for example, or the memory 243 (FIG. 2) of the storage controller 228, for example. Other techniques developed subsequently may be utilized depending upon the particular application.

Following retrieval of the HRTD 510 (FIG. 5A), the index recorded at the end of the index partition 704a (FIGS. 7A, 7B) is read (block 820, FIG. 8) to retrieve (block 824, FIG. 8) the file system metadata described above. In this manner, the meta information on the file system is acquired from the index which is typically recorded in the read XML format.

Conversely, if it is determined (block 808) that the cartridge being loaded is not compatible with known high resolution tape directories, the tape reposition management 255 bypasses retrieval of a high resolution tape directory (HRTD), and instead proceeds to the index partition 704a (FIGS. 7A, 7B), reads (block 820, FIG. 8) the index recorded there to retrieve (block 824, FIG. 8) the file system metadata as described above. Having retrieved the file system metadata, mounting of the file system of the tape is initiated (block 828, FIG. 8) using known file mounting techniques or subsequently developed file mounting techniques. In one embodiment, the acquired metadata is passed to the file system to enable access by applications executing on a host, to the files on the tape.

In accordance with one aspect of tape reposition management in accordance with the present description, prior to processing any host access requests, a determination is made (block 832) as to whether the cartridge being loaded and mounted is compatible with known virtual high resolution tape directories such as the vHRTD type tape cartridges, and if so, the tape is repositioned (block 834) to the EOD data set of the data partition, such as the EOD data set 534 (FIG. 5B). In the illustrated embodiment, the tape is repositioned (block 834) to the EOD data set of the data partition, such as the EOD data set 534 (FIG. 5B) in connection with the loading and mounting of the tape rather than in connection with a host access request.

As previously mentioned, in known tape drive systems, following loading of the tape cartridge, the tape of the just loaded cartridge is repositioned to read the initial index partition to mount the file system of the tape and the tape is then stopped at the beginning (first record) of the data partition following the index partition. The tape is stopped at the first record of the data partition to await the first access (read or write) requested by an application of a host. Because the tape is stopped at the beginning of the data partition, the vHRTD is not available to facilitate rapid access to a desired record or file mark number for application requested accesses.

By comparison, in a tape drive employing tape reposition management in accordance with the present description, the tape is not stopped at the beginning of the data partition but instead the tape is repositioned (block 834) to the EOD data set of the data partition, such as the EOD data set 534 (FIG. 5B), in connection with the initial loading of the tape cartridge and mounting of the file system of the tape. Because the tape is repositioned (block 834) to the EOD data set of the data partition prior to performing any application requested access, the tape is in position for the tape reposition management 255 (FIG. 2) to immediately read (block 838, FIG. 8) the EOD data set of the data partition and retrieve (block 842, FIG. 8) the vHRTD that has been recorded there. The acquired vHRTD information may then be expanded and stored in suitable memory of the system using known techniques. It is appreciated that the vHRTD may be stored in a variety of memory locations such as the memory of the tape drive control unit 320 or the memory 243 of the storage controller 228, for example. Upon storing the acquired vHRTD information in a usable format in memory, loading and mounting of the tape in accordance with the present disclosure may be considered to be complete.

As a result of acquiring and storing the vHRTD in association with loading the tape and mounting the file system of the tape as described herein, upon receipt of any application requested read or write request (block 846, FIG. 8), the tape reposition management 255 (FIG. 2) is ready to rapidly reposition the tape to a specified record or file mark number using the information provided by the vHRTD. In this manner, all application requested read or write accesses may be quickly located notwithstanding that the tape lacks an HRTD type directory stored in a housekeeping data set.

Determination of whether a tape cartridge being loaded is compatible with virtual high resolution tape directories (vHRTD) may be performed using known techniques or using detection techniques which may be subsequently developed. For example, tape drives marketed by IBM which conform to the LINEAR TAPE OPEN® (LTO®) standard, record a virtual high resolution tape directory (vHRTD) in an EOD data set of the data partition because the LTO standard does not permit recording an HRTD type directory in a housekeeping data set. Thus, by detecting for example, that the cartridge being loaded conforms to the LTO standard which does not permit an HRTD, or by detecting for example, that the tape data storage drive 231 (FIG. 3) controlled by the storage controller 228 (FIG. 2) is an LTO type tape data storage drive which does not permit an HRTD, it may be determined that the cartridge being loaded has a vHRTD recorded in the EOD data set of the data partition.

The tape data storage drive 231 may be detected by the storage controller 228 as such an LTO type tape storage drive, for example, when the tape storage drive is coupled to the storage controller and the storage controller and tape drive exchange suitable signals including a signal identifying the tape storage drive as an LTO type tape storage drive which does not permit recording an HRTD in a housekeeping data set. In other embodiments, the tape cartridge 302 may have identifying indicia 654 which may be electronically or optically scanned for example, to identify the cartridge 302 as such an LTO type cartridge in a manner similar to that described above in connection with detecting tape cartridges compatible with HRTD. Other techniques may be used to determine vHRTD compatibility of the cartridge being loaded, depending upon the particular application including the particular type of cartridge and the particular type of tape drive system.

In one embodiment, the tape may be repositioned (block 834) using a "Space EOD" SCSI (Small Computer System Interface) command which moves the tape to the EOD position which in the illustrated embodiment is in a data set of the data partition. It is appreciated that other commands and techniques may be utilized to reposition the tape to the area in which the vHRTD is recorded. It is further appreciated that tape reposition management in accordance with the present description may be utilized in connection with systems recording a vHRTD type directory in other areas of the tape, depending upon the particular application.

It is noted that as the number of files recorded on the tape increases, it may take an increasing amount of time to acquire (block 824, FIG. 8) the meta information for mounting (block 828, FIG. 8) the files of the tape. Although in one embodiment, the tape is repositioned to acquire (block 824) meta information and is then repositioned (block 834) to the EOD data set of the data partition in accordance with tape reposition management of the present description, in order to shorten the overall mounting time (block 828), the meta information may be acquired (block 824) concurrently with the tape movement (block 834) to the data partition to acquire the vHRTD as described herein.

If it is determined (block 832) that the cartridge being loaded is not compatible with known virtual high resolution tape directories such as the vHRTD type tape cartridges, repositioning (block 834) of the tape to the EOD data set of the data partition is bypassed. In this manner, retrieval of a vHRTD type directory (block 842) is also bypassed. Instead, the tape is repositioned (block 850) to the beginning of the data partition. For example, TS11xx type tape drives marketed by IBM utilize an HRTD type directory recorded in a housekeeping data set and thus are not compatible with known virtual high resolution tape directories such as the vHRTD type tape cartridges. Thus, if the tape cartridge being loaded is an TS11xx type tape cartridge for TS11xx tape drives, the tape is repositioned (block 850) to the beginning of the first data partition, and loading and mounting of such a tape is deemed to be complete.

In this manner, if the tape cartridge being loaded is detected as compatible with a virtual high resolution tape directory (vHRTD). the tape is automatically repositioned to read and retrieve the vHRTD in association with the tape loading and file system mounting process instead of being repositioned to the start of a data partition. As a result, the tape may be readily and quickly repositioned using the acquired vHRTD information, to a record number or file mark number specified by a subsequently received tape read or write access initiated by an application executing on a host.

Loading a tape, mounting a tape file system, repositioning a tape and retrieving a tape directory are, in general, well understood computer operational techniques. In one embodiment, these well known computer operational techniques may be modified as disclosed in the figures and accompanying description, and employed for tape reposition management in accordance with the present description after suitable modification.

Figure 9A:
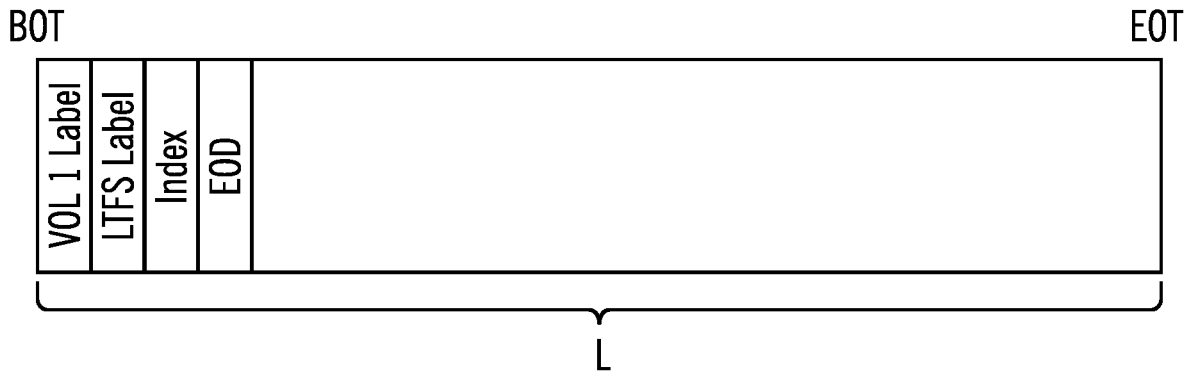
FIG. 9A illustrates an example of a tape having a beginning of tape (BOT) at one end of the tape and an end of tape (EOT) at the other end of the tape.

FIG. 9A shows an example of a tape in schematic form for which reposition management in accordance with the present description may be employed. In this example, the tape has a beginning of tape area BOT at one end and an end of tape area EOT at the other end. In this embodiment, both the end position of the first index partition 704a (FIG. 7B) and the beginning position 718a of the data partition are at or near the Begin of Tape (BOT) end with respect to the tape length L which may be various lengths such as 1000 meters, for example.

As shown in FIG. 9B, the average travel distance from the BOT end to an arbitrary position ("any position") is L/2, where L is the tape length. By comparison, the average travel distance from one arbitrary position to another arbitrary position ("any position") on the tape is L/3.

As previously mentioned, a known tape directory (TD) subdivides a tape wrap into two subareas and identifies the records recorded in each subarea. Accordingly, FIG. 9C shows a known example in which a tape has been subdivided into two subareas, a first subarea beginning at record X and ending at record Y before the beginning of the second subarea. By comparison, a known vHRTD type directory subdivides a tape wrap into 64 subareas, a portion of which are represented in FIG. 9D. Thus, when the vHRTD is not used, a TD type directory typically identifies the record numbers as being in one of only two potential subareas, one toward the middle of the wrap and one toward the end of the wrap. In order to move to a target record such as Target Record Z, for example, which is intermediate Record X and Record Y as shown in FIG. 9C, in a known repositioning calculation, an approximate initial search position is calculated based on the ratio between the beginning and last record numbers of the TD subarea that contains the target record, that is, Target Record number Z. In the example of FIG. 9C, the initial search position is calculated as:

$$L/2*(Z-X)/(Y-X)-M$$

where M is a margin of sufficient length to accommodate the variable lengths of records, and X, Y and Z are the record numbers of the records Record X, Record Y and Record Z, respectively. Accordingly, a jump as represented by the dashed line arrow in FIG. 9C, is made to an initial search position as represented by the arrowhead of the dashed line arrow, which precedes the position $L/2*(Z-X)/(Y-X)$ by the margin M. The target record is then searched for while reading the data sets one by one.

By comparison, when a vHRTD is used, one wrap is divided into 64 subareas as partially represented by multiple subareas in FIG. 9D, in which the records (or ranges of records) recorded in each subarea are identified in the vHRTD. As a result, because record numbers are sequential, the particular tape subarea in which the target record is recorded is readily determined from the record numbers identified at the beginning and end of each subarea. Accordingly, a move as represented by the solid line arrow in FIG. 9D, is made to the beginning of the determined subarea as represented by the arrowhead of the solid arrow in FIG. 9D, at high speed and, from there, the data set in the subarea is searched until the target record is found.

Example comparisons of repositioning travel times are made herein below between those of a known tape drive and a tape drive employing one embodiment of tape reposition management in accordance with the present description. As previously mentioned, in one known LTO type tape drive, the tape is repositioned to the beginning of the data partition after reading the index for mounting the file system, to await the first application requested access to the tape. By comparison, in a tape drive employing one embodiment of tape reposition management in accordance with the present description, the tape is immediately repositioned to the EOD data set of the data partition after reading the index to retrieve the vHRTD and then await the first application requested access to the tape.

In tape drives employing an LTFS type file system, a read command issued by an application executing on a host causes the tape to be repositioned to an arbitrary position on the tape for reading the requested records or file. A write command issued by an application executing on a host causes the tape to be repositioned to the last recorded EOD position for writing new data. In this comparison, it is assumed that an application command is not issued immediately after mounting but is eventually issued when the application needs reading or writing.

In this comparison, it is assumed that the initial tape travel time from the point the cartridge is loaded until the index file is read and the file system metadata is retrieved, is substantially the same in both the known tape drive and one employing tape reposition management in accordance with the present description. FIG. 10A depicts the index partition which includes wrap 0. The tape position at which the index file has been read is represented as tape position P of in this example. However, it is appreciated that this initial travel time may vary between known tape drives and tape drives employing tape reposition management in accordance with the present description, depending upon the particular application. FIGS. 10A-10D also depict a data partition which in this example, has two wraps, a wrap in one direction (which may be wrap 4, for example) and a wrap in the backward direction (which may be wrap 5, for example) in each figure of FIGS. 10A-10D. It is appreciated that a data partition may have many more wraps as previously described, depending upon the particular application.

In a first comparison example, an estimation may be made of an average time taken for travel from the last data position in the initial index partition (indicated at position P in FIG. 10A) to the beginning (indicated at position Q in FIG. 10A) of the data partition, in this example, for a known tape drive. In this example, This tape travel time is represented by dashed line arrows in FIG. 10A. In known tape drives, this travel time from the index position P written at the end of the index partition to the beginning position Q of the data partition is often about 10 seconds, for a typical travel speed represented by $S_N$ meters/second. Because the start and end points of travel are adjacent the BOT end of the tape, a search is generally not required.

For comparison purposes, an estimation may also be made of an average time taken for travel from the last data position in the initial index partition (indicated at position P in FIG. 10A) to the EOD data set in which the last vHRTD has been recorded to retrieve the vHRTD in accordance with tape reposition management in accordance with the present description. This tape travel time is represented by a solid line arrow in FIG. 10A. In this example, the EOD data set in which the last vHRTD has been recorded is written at an arbitrary position in wrap 5, representing the last portion of a data partition written before the tape was dismounted. Since the vHRTD to be retrieved in accordance with tape reposition management in accordance with the present description is at an arbitrary position, the average time taken for travel from the last data position in the initial index partition (indicated at position P in FIG. 10A) near the BOT to the EOD data set in which the last vHRTD has been recorded may be estimated as $L/(2*S_V)$ seconds where $S_V$ meters/second represents an average expected travel speed for a tape drive employing tape reposition management in accordance with the present description, and $S_V > S_N$ meters/second. Because the position of the target EOD data set is typically identified by data stored in memory a search for the target EOD data set will often not be needed. The retrieved vHRTD information may be expanded and stored in a suitable memory very quickly and thus the time for such expansion and storing may be effectively ignored for purposes of this comparison.

In another comparison example, an estimation may be made of an average time taken in a known tape drive, for travel from the beginning (indicated at position Q in FIG. 10B) of the data partition, in this example, to an arbitrary position to meet an application request for reading at that arbitrary position on the tape. In this example, this tape travel time for a known tape drive is represented by dashed line arrow in FIG. 10B. In such known tape drives, an average travel time from the beginning position Q of the data partition to the arbitrary position is $L/(2*S_N)$ seconds since the beginning position Q of the data partition is near the BOT end of the tape. To find the target record of file of the application request, an extensive search is typically experienced because the vHRTD information has not yet been retrieved from the EOD data area in a known tape drive and therefore a vHRTD is unavailable in such known tape drives to facilitate locating the target record or file requested by the application read operation.

For comparison purposes, an estimation may also be made of an average time taken for travel from the EOD data area in which the last vHRTD has been retrieved in accordance with tape reposition management in accordance with the present description to an arbitrary position to meet an application request for reading at that arbitrary position on the tape. This tape travel time is represented by a solid line arrow in FIG. 10B. As previously noted, the EOD data area in which the last vHRTD has been recorded is written at an arbitrary position at the end of a data partition representing the last data set of the data partition written before the tape was previously dismounted. Similarly, the target record or file is also at an arbitrary position. The average travel time from one arbitrary position to another arbitrary position may be estimated as $L/(3*S_V)$ seconds. In a tape drive employing tape reposition management in accordance with the present description, a search for the target record or file is relatively brief since the vHRTD information has been retrieved and stored in a system memory to facilitate the search for the target record or file requested by the application request.

In yet another comparison example, an estimation may be made of an average time taken in a known tape drive, for travel from the beginning (indicated at position Q in FIG. 10C) of the data partition, in this example, to an arbitrary position to meet an application request for writing. In many tape drives, writing of new file data typically starts from the EOD data set position of the last write operation, which is an arbitrary position. In this example, this tape travel time for a known tape drive is represented by dashed line arrow in FIG. 10C. In such known tape drives, an average travel time from the beginning position Q of the data partition to the last recorded EOD position, an arbitrary position, is $L/(2*S_N)$ seconds since the beginning position Q of the data partition is near the BOT end of the tape.

For comparison purposes, an estimation may also be made of an average time taken for travel from the EOD position (FIG. 10C) in which the last recorded vHRTD has been retrieved in accordance with tape reposition management in accordance with the present description, to an arbitrary position to meet an application request for writing at that arbitrary position on the tape, As previously noted, the EOD data area in which the last vHRTD has been recorded is written at the end of a data partition representing the last data set written before the tape was dismounted. Also as noted above, in many tape drives, writing of new file data typically starts from the EOD position of the last write operation, which is the current tape position in this example of tape reposition management in accordance with the present description. Thus, since the tape is already positioned at the EOD position to initiate the new write operation, zero travel time is needed for a tape drive employing tape reposition management in accordance with the present description.

In still another comparison example, an estimation may be made of an average time taken in a known tape drive, for travel from one arbitrary position, such as the site of the last read operation, to another arbitrary position to meet another application request for reading. In this example, this tape travel time from the site of one read operation to anther read operation for a known tape drive is represented by a dashed line arrow in FIG. 10D. In known tape drives, an average travel time from one arbitrary position to another arbitrary position is $L/(3*S_N)$ seconds. In known tape drives, vHRTD information may be retrieved from the EOD data area in response to an application write operation to facilitate subsequent read operations requested by an application. Thus if vHRTD information has been retrieved from the EOD data area in response to a prior application write operation, searches for target records or files in response to subsequent application access read requests may be facilitated by a vHRTD in those instances in a known tape drive. However, if a prior write operation has not yet been requested such that the vHRTD information has not yet been retrieved, an extensive search is typically experienced in a known tape drive to find the target record or file of the application read request.

For comparison purposes, an estimation may be made of an average time taken in a tape drive employing tape reposition management in accordance with the present description, for travel from one arbitrary position, such as the site of the last read operation, to another arbitrary position to meet another application request for reading. In this example, this tape travel time from the site of one read operation to another read operation for a tape drive employing tape reposition management in accordance with the present description is represented by a solid line arrow in FIG. 10D. Here, an average travel time from one arbitrary position to another arbitrary position is $L/(3*S_V)$ seconds. In tape drives employing tape reposition management in accordance with one embodiment of the present description, vHRTD information has already been retrieved from the EOD data area prior to executing the first application read or write request. Thus, the vHRTD is available to facilitate all application read requests by an application.

It is appreciated that should a read request come immediately upon mounting of the cartridge file system in a known tape drive, tape repositioning in accordance with the present description may take longer for that initial read request than tape repositioning in a known tape drive. For example, if $T_V$ represents the repositioning time for a tape drive employing tape reposition management in accordance with the present description, and $T_N$ represents repositioning time for a known tape drive, the comparison $T_V-T_N$ may be represented as:

$$L/(2*S_V)+L/(3*S_V)-L/(2*S_N)-10 \text{ seconds.}$$

However, read requests typically do not come immediately after the cartridge file system is mounted in known tape drives. Accordingly, if the first read request comes when at least $L/(2*S_V)+L/(3*S_V)-L/(2*S_N)-10$ seconds have elapsed after the cartridge file system is mounted in the known tape drive, it is believed that repositioning time for a tape drive employing tape reposition management in accordance with the present description will be faster for the initial read request than such for a known tape drive. Similarly, for all subsequent read requests, it is believed that repositioning time for a tape drive employing tape reposition management having an available vHRTD tape directory in accordance with the present description will be faster than such for a known tape drive in which a vHRTD is not yet available.

In the event a write request comes immediately after the cartridge file system is mounted, the comparison $T_V-T_N$ nay be represented as:

$$L/(3*S_V)-L/(2*S_N)-10 \text{ seconds}<L/(6*S)-10<0$$

and is satisfied where S is approximately equal to $S_V$. $L/(6*S)$ should be negative as described above so that the equation is always negative. Thus, it is believed that repositioning time for a tape drive employing tape reposition management in accordance with the present description will be faster for the initial write request than such for a known tape drive. It is appreciated that in response to an initial write request in a known tape drive, a vHRTD may be retrieved from the EOD data set to facilitate subsequent application access requests.

If the tape position is in an arbitrary position and a vHRTD has not yet been retrieved in a known tape drive, a comparison of the travel times $T_V-T_N$ in response to a request for reading or writing at another arbitrary position may be represented as:

$$L/(3*S_V)-L/(3*S_N)<0$$

and is satisfied. Thus, it is believed that repositioning time for a tape drive employing tape reposition management in accordance with the present description will be faster for these arbitrary position to arbitrary position repositionings, as compared to that for a known tape drive. As noted above, it is appreciated that in response to a subsequent write request in a known tape drive, a vHRTD may be retrieved from the EOD data set to facilitate subsequent application access requests. On the other hand, should read requests continue without a write request in which a vHRTD is acquired, it is believed that repositioning time for a tape drive employing tape reposition management having an available vHRTD tape directory in accordance with the present description will be faster than such for a known tape drive in which a vHRTD is not yet available.

Figure 11:
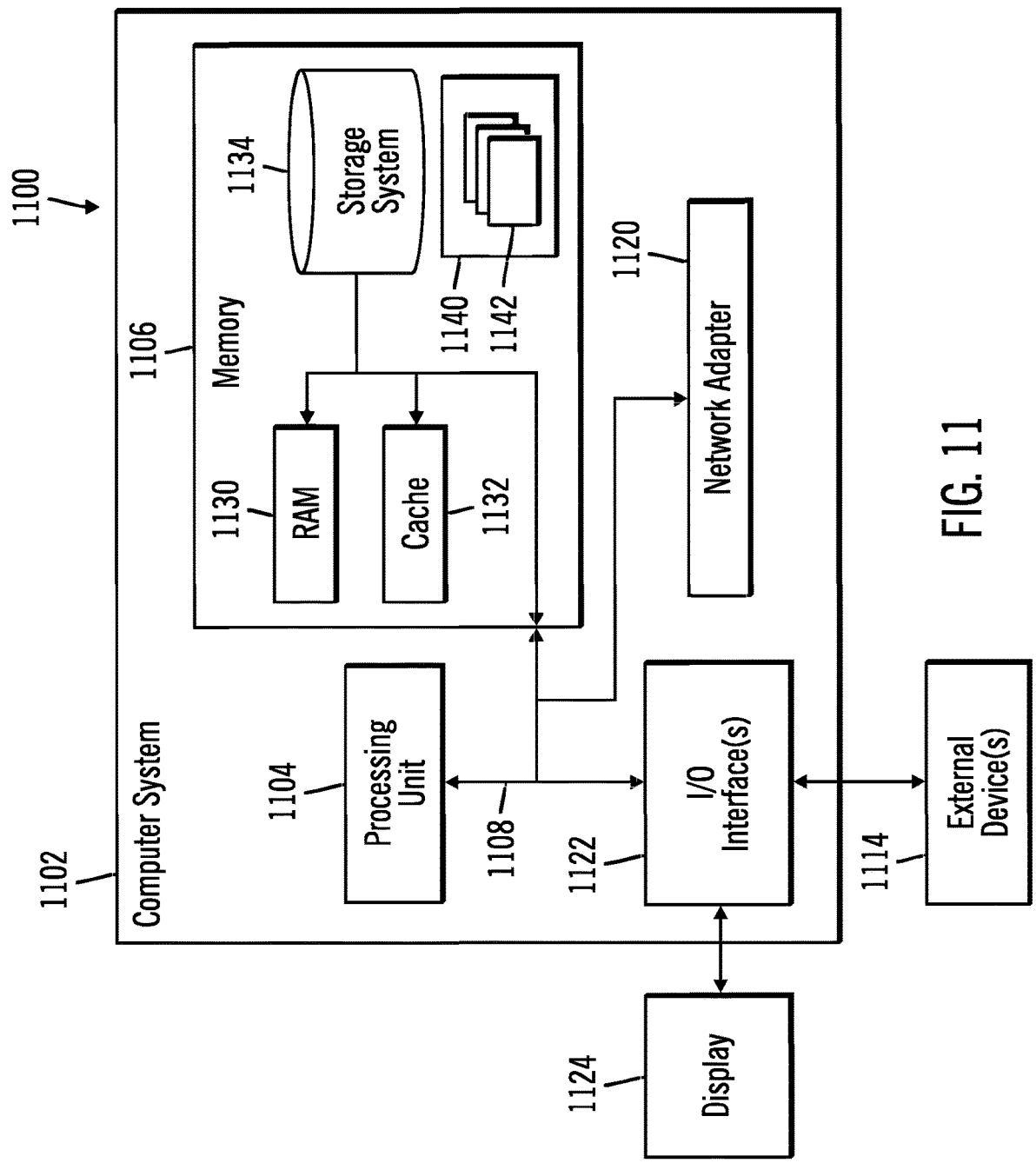
FIG. 11 illustrates another embodiment of a computing environment employing an aspect of tape reposition management in accordance with the present description.

Aspects of the tape reposition management 255 (FIG. 2) and tape reposition logic 257 may be embodied in a computer system/server in a single location, or in at least one embodiment, may be configured in a cloud-based system sharing computing resources. With reference to FIG. 11, a block diagram is provided illustrating an example of a computer system 1100 including a computer/server 1102, hereinafter referred to as a host 1102 in communication with a cloud based support system, to implement the system, tools, and processes described above with respect to FIGS. 1A-3 and 8. Host 1102 is operational with numerous other general purpose or special purpose computer system environments or configurations. Examples of well-known computer systems, environments, and/or configurations that may be suitable for use with host 1102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computational components of the figures may be implemented in one or more computer systems, such as the computer system or host 1102 shown in FIG. 11. Host 1102 may be described in the general context of computer system-executable instructions, such as program modules, being executed by a computer system. Generally, program modules may include routines, programs, objects, components, logic, data structures, and so on that perform particular tasks or implement particular abstract data types. Host 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, host 1102 is shown in the form of a general-purpose computing device. The components of host 1102 may include, but are not limited to, one or more processors or processing devices or units 1104, e.g. hardware processors, a system memory 1106, and a bus 1108 that couples various system components including system memory 1106 to processing device 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 1102 typically includes a variety of computer system readable media. Such media may be any available media that is accessible by host 1102 and it includes both volatile and non-volatile media, removable and non-removable media.

Memory 1106 can include computer system readable media in the form of volatile memory, such as random access memory (RAM) 1130 and/or cache memory 1132. By way of example only, a storage system 1134 can be provided for reading from and writing to a nonremovable, non-volatile magnetic media (not shown and typically called a "tape drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1140, having a set (at least one) of program modules 1142, may be stored in memory 1106 by way of example, and not limitation, as well as an operating system, one or more application programs, other program modules, and program data. Each of the operating systems, one or more application programs, other program modules, and program data or some combination thereof, may include an implementation of a networking environment. Program modules 1142 generally carry out the functions and/or methodologies of embodiments to ensure a vHRTD directory is available for application requested accesses. For example, the set of program modules 1142 may include the tape reposition management 255 as described in FIG. 2.

Host 1102 may also communicate with one or more external devices 1114, such as a keyboard, a pointing device, etc.; a display 1124; one or more devices that enable a user to interact with host 1102; and/or any devices (e.g., network card, modem, etc.) that enable host 1102 to communicate with one or more other computing devices. Such communication can occur via Input/Output (I/O) interface(s) 1122. Still yet, host 1102 can communicate with one or more networks such as a local area network (LAN), a general wide area network (WAN), and/or a public network (e.g., the Internet) via network adapter 1120. As depicted, network adapter 1120 communicates with the other components of host 1102 via bus 1108. In at least one embodiment, a plurality of nodes of a distributed file system (not shown) is in communication with the host 1102 via the I/O interface 1122 or via the network adapter 1120. It should be understood that although not shown, other hardware and/or software components could be used in conjunction with host 1102. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 1106, including RAM 1130, cache memory 1132, and storage system 1134, such as a removable storage drive and a hard disk installed in a hard disk drive. Computer programs (also called computer control logic) are stored in memory 1106. Computer programs may also be received via a communication interface, such as network adapter 1120. Such computer programs, when run, enable the computer system to perform the features of the present embodiments as discussed herein. In particular, the computer programs, when run, enable the processing device 1104 to perform the features of the computer system. As such, computer programs may represent controllers of the computer system. Accordingly, the functionality for the reposition management 255, as described in the figures, may be embodied as computer program code stored in memory 1106 (in some embodiments as program modules 1142), where the computer program code includes the instructions to be executed by the processing device 1104 to provide the functionality of the reposition management 255 as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (: NAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

Accordingly, the functionality for the reposition management, as described in the figures, may be embodied as computer readable program instructions to be executed by one or more hardware devices other than, or in addition to, the processing device 1104 to provide the functionality of the reposition management 255 as described herein.

In at least one embodiment, host 1102 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 12:
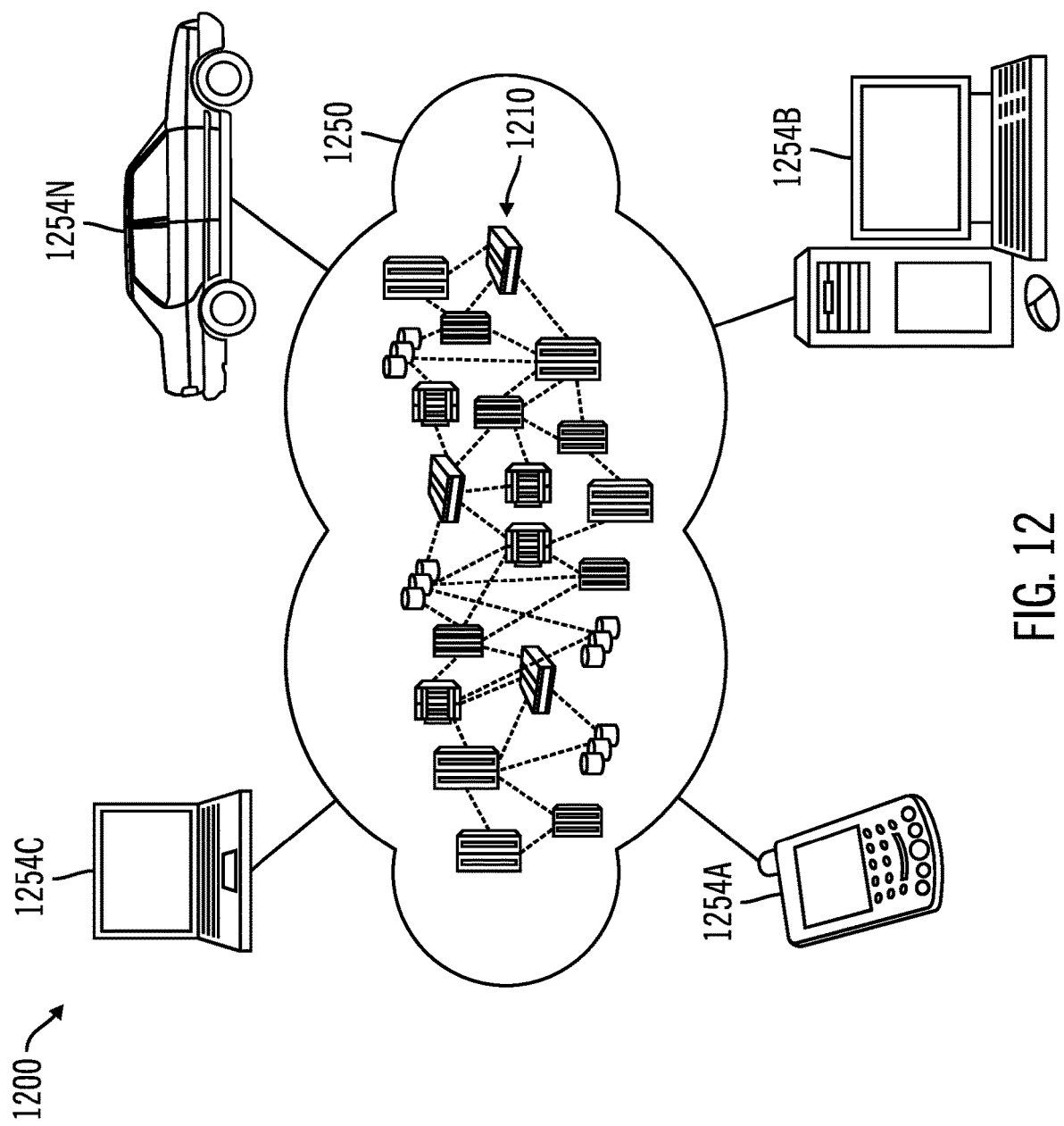
FIG. 12 is a schematic diagram illustrating a cloud computer environment, in accordance with some embodiments of the present disclosure.

Referring now to FIG. 12, a schematic diagram is provided illustrating an example cloud computing network 1200. As shown, cloud computing network 1200 includes a cloud computing environment 1250 having one or more cloud computing nodes 1210 with which local computing devices used by cloud consumers may communicate. Examples of these local computing devices include, but are not limited to, personal digital assistant (PDA) or cellular telephone 1254A, desktop computer 1254B, laptop computer 1254C, and/or automobile computer system 1254N. Individual nodes within nodes 1210 may further communicate with one another. They may be grouped (not shown) physically or virtually, in one or more networks, such as Private, Community, Public, or Hybrid clouds as described hereinabove, or a combination thereof. This allows the cloud computing network 1200 to offer infrastructure, platforms and/or software as services for which a cloud consumer does not need to maintain resources on a local computing device. It is understood that the types of computing devices 1254A-N shown in FIG. 8 are intended to be illustrative only and that the cloud computing environment 1250 can communicate with any type of computerized device over any type of network and/or network addressable connection (e.g., using a web browser).

Figure 13:
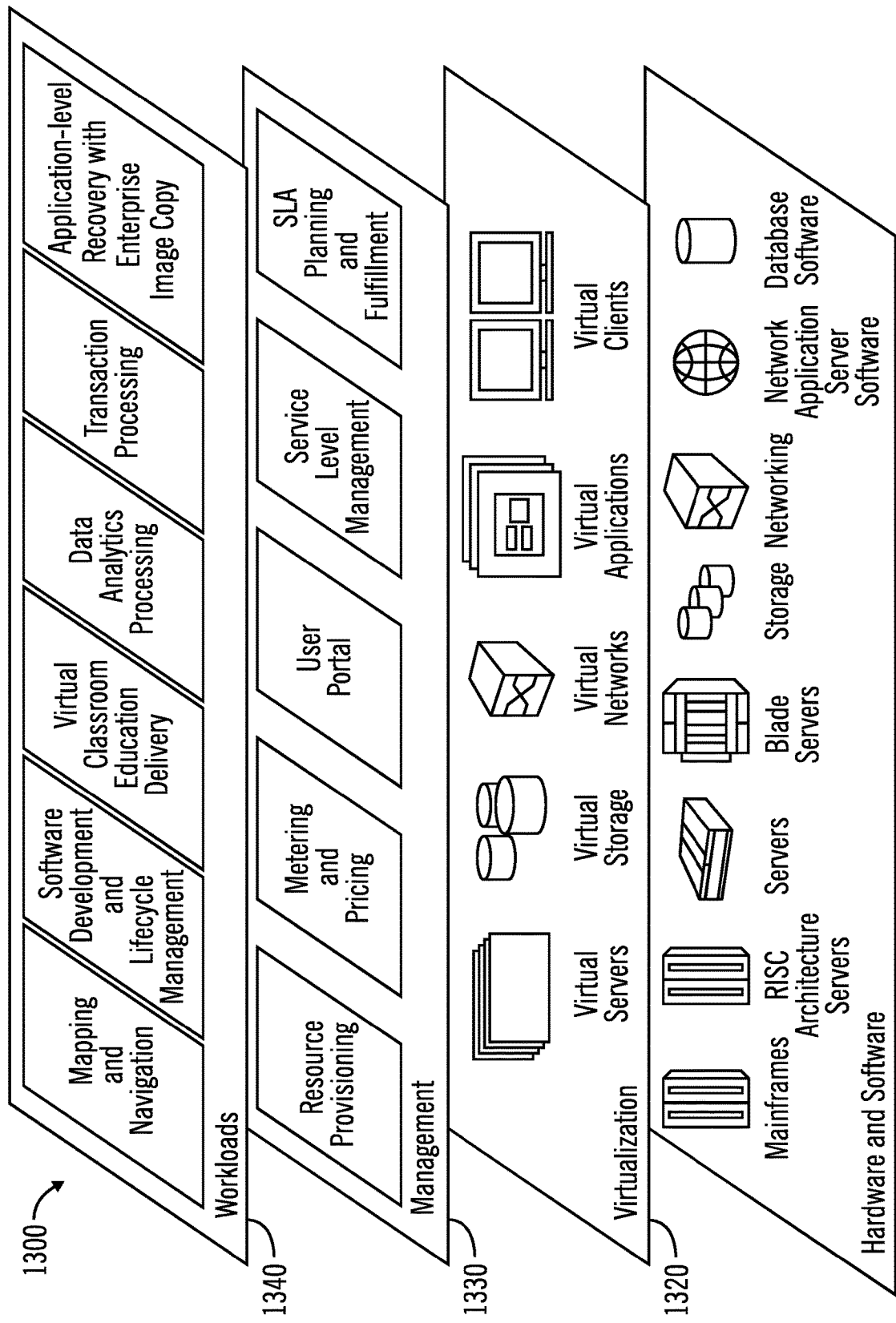
FIG. 13 is a block diagram illustrating a set of functional abstraction model layers provided by the cloud computing environment, in accordance with some embodiments of the present disclosure.

Referring now to FIG. 13, a set of functional abstraction layers 1300 provided by the cloud computing network of FIG. 12 is shown. It should be understood in advance that the components, layers, and functions shown in FIG. 13 are intended to be illustrative only, and the embodiments are not limited thereto. As depicted, the following layers and corresponding functions are provided: hardware and software layer 1310, virtualization layer 1320, management layer 1330, and workload layer 1340.

The hardware and software layer 1310 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 1320 provides an abstraction layer from which the following examples of virtual entities may be provided: virtual servers; virtual storage; virtual networks, including virtual private networks; virtual applications and operating systems; and virtual clients.

In one example, management layer 1330 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 1340 provides examples of functionality for which the cloud computing environment may be utilized. Examples of workloads and functions which may be provided from this layer include, but are not limited to mapping and navigation; software development and lifecycle management; virtual classroom education delivery; data analytics processing; transaction processing; and application-level recoveries performed with enterprise level image copies.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for a data storage system having a tape drive for use with a tape having a linear tape file system (LTFS), an index partition and a data partition, wherein the tape drive is resident in a enterprise computer system having a memory and wherein the computer program product comprises a computer readable storage medium having program instructions executable by a processor of the enterprise computer system to cause operations, the operations comprising:
   in response to loading a tape in the tape drive, initiating mounting the tape LTFS including reading an index partition on the tape to extract metadata for mounting the tape LTFS; and
   prior to accessing a data area of the tape in response to any application access request,
      repositioning the tape within a data partition to read a vHRTD (virtual High Resolution Tape Directory) recorded in an EOD (End of Data) portion of the data partition; and
      reading the EOD portion to retrieve the vHRTD.

2. The computer program product of claim 1 wherein the tape conforms to an LTO (Linear Tape-Open) standard and lacks a high resolution tape directory (HRTD) recorded in a housekeeping portion of the tape.

3. The computer program product of claim 1 wherein the operations further comprise after reading the EOD portion to retrieve the vHRTD, waiting for receipt of a first application access request.

4. The computer program product of claim 1 wherein repositioning the tape within a data partition having a vHRTD (virtual High Resolution Tape Directory) recorded in an EOD (End of Data) portion of the data partition is initiated immediately after reading an index partition on the tape to extract metadata for mounting the tape LTFS.

5. The computer program product of claim 1, wherein the operations further comprise expanding the vHRTD retrieved from the EOD portion, in a memory of the enterprise computer system.

6. The computer program product of claim 1 wherein the operations further comprising extracting file system metadata as the index partition is read concurrently with repositioning the tape to the data partition having the vHRTD.

7. The computer program product of claim 1 wherein the operations further comprise bypassing repositioning and stopping the tape at the beginning of a data partition after reading the index partition containing meta information for mounting the tape LTFS and proceeding directly to repositioning the tape to a data set having the vHRTD after reading the index partition containing metadata for mounting the tape LTFS.

8. An enterprise computer system, comprising:
   a processor;
   a memory;
   a data storage system having a tape drive for use with a tape having a linear tape file system LTFS (Linear Tape File System), an index partition and a data partition, wherein the tape drive is resident in the enterprise computer system; and
   computer program product for the enterprise computer system wherein the computer program product comprises a computer readable storage medium having program instructions executable by a processor of the enterprise computer system to cause operations, the operations comprising:
      in response to loading a tape in the tape drive, initiating mounting the tape LTFS including reading an index partition on the tape to extract metadata for mounting the tape LTFS; and
      prior to accessing a data area of the tape in response to any application access request,
         repositioning the tape within a data partition to read a vHRTD (virtual High Resolution Tape Directory) recorded in an EOD (End of Data) portion of the data partition; and
         reading the EOD portion to retrieve the vHRTD.

9. The computer system of claim 8 wherein the tape conforms to an LTO (Linear Tape-Open) standard and lacks a high resolution tape directory (HRTD) recorded in a housekeeping portion of the tape.

10. The computer system of claim 8 wherein the operations further comprise after reading the EOD portion to retrieve the vHRTD, waiting for receipt of a first application access request.

11. The computer system of claim 8 wherein repositioning the tape within a data partition having a vHRTD (virtual High Resolution Tape Directory) recorded in an EOD (End of Data) portion of the data partition is initiated immediately after reading an index partition on the tape to extract metadata for mounting the tape LTFS.

12. The computer system of claim 8, wherein the operations further comprise expanding the vHRTD retrieved from the EOD portion, in a memory of the enterprise computer system.

13. The computer system of claim 8 wherein the operations further comprise extracting file system metadata as the index partition is read concurrently with repositioning the tape to the data partition having the vHRTD.

14. The computer system of claim 8 wherein the operations further comprise bypassing repositioning and stopping the tape at the beginning of a data partition after reading the index partition containing meta information for mounting the tape LTFS and proceeding directly to repositioning the tape to a data set having the vHRTD after reading the index partition containing metadata for mounting the tape LTFS.

15. A method, comprising:
   loading a tape in a tape drive having a linear tape file system LTFS (Linear Tape File System) in a tape drive;
   initiating mounting the tape LTFS including reading an index partition on the tape to extract metadata for mounting the tape LTFS; and
   prior to accessing a data area of the tape in response to any application access request, repositioning the tape within a data partition to read a vHRTD (virtual High Resolution Tape Directory) recorded in an EOD (End of Data) portion of the data partition; and reading the EOD portion to retrieve the vHRTD.

16. The method of claim 15 wherein the tape conforms to an LTO (Linear Tape-Open) standard and lacks a high resolution tape directory (HRTD) recorded in a housekeeping portion of the tape.

17. The method of claim 15 further comprising after reading the EOD portion to retrieve the vHRTD, waiting for receipt of a first application access request.

18. The method of claim 15 wherein repositioning the tape within a data partition having a vHRTD (virtual High Resolution Tape Directory) recorded in an EOD (End of Data) portion of the data partition includes bypassing repositioning and stopping the tape at a data partition after reading the index partition containing meta information for mounting the tape LTFS so that repositioning proceeds immediately to the data partition having the vHRTD after reading the index partition containing metadata for mounting the tape LTFS.

19. The method of claim 15, further comprising expanding the vHRTD retrieved from the EOD portion, in a memory of an enterprise computer system which includes the tape drive.

20. The method of claim 15 further comprising extracting file system meta information as the index partition is read concurrently with repositioning the tape to the data partition having the vHRTD.

* * * * *